(12) United States Patent
Kawanami et al.

(10) Patent No.: US 10,160,601 B2
(45) Date of Patent: Dec. 25, 2018

(54) BELT TRANSPORTING DEVICE AND IMAGE FORMING APPARATUS

(71) Applicant: CANON KABUSHIKI KAISHA, Tokyo (JP)

(72) Inventors: Takeo Kawanami, Kamakura (JP); Yoshihiro Ito, Mishima (JP); Kenji Watanabe, Suntou-gun (JP); Daigo Yamauchi, Yokohama (JP); Fumiya Sawashima, Tokyo (JP); Osamu Sasaoka, Kawasaki (JP); Yoichiro Iizuka, Tokyo (JP); Hiromi Fujinaka, Chofu (JP); Takugo Kasaishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/683,373

(22) Filed: Aug. 22, 2017

(65) Prior Publication Data

US 2017/0349378 A1      Dec. 7, 2017

Related U.S. Application Data

(63) Continuation of application No. 14/810,326, filed on Jul. 27, 2015, now Pat. No. 9,771,221, which is a
(Continued)

(30) Foreign Application Priority Data

Nov. 29, 2012   (JP) ................................ 2012-261450
Nov. 29, 2012   (JP) ................................ 2012-261451
Nov. 29, 2012   (JP) ................................ 2012-261452

(51) Int. Cl.
  *B65G 39/16*      (2006.01)
  *B65G 15/64*      (2006.01)
(Continued)

(52) U.S. Cl.
  CPC ............. *B65G 15/64* (2013.01); *B65G 39/16* (2013.01); *G03G 15/0189* (2013.01);
(Continued)

(58) Field of Classification Search
  CPC .... B65G 15/64; B65G 39/16; G03G 15/0189; G03G 15/161; G03G 15/755;
(Continued)

(56) References Cited

U.S. PATENT DOCUMENTS 3,368,665 A  *  2/1968  Jinkins ................... B65G 39/16
                                                              198/806
4,174,171 A  *  11/1979 Hamaker ............. G03G 15/755
                                                              198/806
(Continued)

FOREIGN PATENT DOCUMENTS

JP        2000047528 A     2/2000
JP        2014106482 A     6/2014

*Primary Examiner* — James R Bidwell
(74) *Attorney, Agent, or Firm* — Canon U.S.A., Inc. IP Division

(57) ABSTRACT

A belt transporting device includes a belt; first and second adjustment members provided at two respective ends of a tension roller in a belt width direction orthogonal to a direction of rotation of the belt, the first and second adjustment members each being movable by receiving a force from the belt; and a link member that interlocks the movement of the first adjustment member and the movement of the second adjustment member. If the belt is laterally shifted in the belt width direction, one of the first and second adjustment members moves by receiving a force from the belt while the other is moved by the link member such that the tension roller is tilted with respect to a driving roller.

13 Claims, 21 Drawing Sheets

Related U.S. Application Data continuation of application No. 14/090,890, filed on Nov. 26, 2013, now Pat. No. 9,212,004.

(51) Int. Cl.
*G03G 15/16* (2006.01)
*G03G 15/01* (2006.01)

(52) U.S. Cl.
CPC ....... *G03G 15/161* (2013.01); *G03G 15/1615* (2013.01); *G03G 2215/00156* (2013.01)

(58) Field of Classification Search
CPC ............... G03G 15/1615; G03G 15/01; G03G 2215/00156; G03G 15/16
USPC ................................... 198/806, 807, 810.03
See application file for complete search history.

(56) References Cited

U.S. PATENT DOCUMENTS

| | | | | |
|---|---|---|---|---|
| 4,332,458 A | * | 6/1982 | Hoffman | G03G 15/283 |
| | | | | 198/806 |
| 5,358,098 A | * | 10/1994 | Sundstrom | B65G 39/16 |
| | | | | 198/806 |
| 5,896,979 A | * | 4/1999 | Hokari | G03G 15/755 |
| | | | | 198/806 |
| 6,181,900 B1 | * | 1/2001 | Lee | G03G 15/755 |
| | | | | 198/806 |
| 2010/0247167 A1 | * | 9/2010 | Wing | G03G 15/0131 |
| | | | | 399/302 |

\* cited by examiner

BELT TRANSPORTING DEVICE AND IMAGE FORMING APPARATUS

CROSS-REFERENCE TO RELATED APPLICATIONS

This application is a continuation of U.S. application Ser. No. 14/810,326, filed Jul. 27, 2015 and issued as U.S. Pat. No. 9,771,221 on Sep. 26, 2017, which is a continuation of U.S. patent application Ser. No. 14/090,890 filed Nov. 26, 2013 and issued as U.S. Pat. No. 9,212,004 on Dec. 15, 2015, which claims the benefit of Japanese Patent Applications No. 2012-261450 filed Nov. 29, 2012, No. 2012-261451 filed Nov. 29, 2012, and No. 2012-261452 filed Nov. 29, 2012, all of which are hereby incorporated by reference herein in their entirety.

BACKGROUND OF THE INVENTION

Field of the Invention

The present invention relates to a belt transporting device that rotates an endless belt stretched around a plurality of stretching members, and to an image forming apparatus, such as an electrophotographic printer, copier, or the like, including the belt transporting device.

Description of the Related Art

Some of known image forming apparatuses such as electrophotographic printers and copiers each include a belt transporting device that rotates an endless belt stretched around a plurality of stretching members. It is known that such a belt transporting device has a problem in that, when the belt is rotated, the belt may be laterally shifted toward one end side in a belt width direction (the axial direction of the stretching rollers) that is orthogonal to the direction of belt rotation.

To solve the above problem, Japanese Patent Laid-Open No. 11-116089 discloses an exemplary device of adjusting the lateral shift of a belt by utilizing a force (running torque) acting in a direction of rotation of the belt. Specifically, the device disclosed by Japanese Patent Laid-Open No. 11-116089 includes contact members and cams. The contact members rotate in the direction of rotation of the belt by coming into contact with the belt that is under rotation. The initial positions (initial phases) of the contact members are determined by urging springs. The cams rotate together with the respective contact members. When the belt is laterally shifted toward one end side in the belt width direction, the belt comes into contact with one of the contact members, and a running torque is transmitted from the belt to that contact member. When the contact member rotates by a specific angle or larger, a corresponding one of the cams causes a corresponding one of the axial ends of a follower roller to be displaced in a direction vertical to the axis of the follower roller. Thus, in the device disclosed by Japanese Patent Laid-Open No. 11-116089, the lateral shift of the belt is adjusted by tilting the follower roller with respect to a driving roller.

The device disclosed by Japanese Patent Laid-Open No. 11-116089 includes the urging springs that urge the respective axial ends of the follower roller in the vertical direction so that the axial ends of the follower roller are returned to the respective initial positions. Specifically, after the lateral shift of the belt is adjusted, the follower roller is pulled by a corresponding one of the urging springs so that the tilt at the end of the follower roller is eliminated. Thus, the position of an axial end of the follower roller is adjusted.

That is, in the device disclosed by Japanese Patent Laid-Open No. 11-116089, to displace the axial end of the follower roller by rotating the contact member for adjusting the lateral shift of the belt, a running torque exceeding a restoring force exerted by the urging spring needs to be applied from the belt to the contact member. This may damage the end of the belt with a load applied thereto when the belt rotates the contact member. Moreover, while the axial end of the follower roller is being displaced, a force exceeding the spring force exerted by the urging spring is applied to an area of contact between the contact member and the belt. In such a situation, a large load is applied to the belt.

SUMMARY OF THE INVENTION

The present invention provides a belt transporting device that is capable of adjusting any lateral shift of a belt with a small load applied to the belt, and an image forming apparatus including the belt transporting device.

According to an aspect of the present invention, a belt transporting device includes an endless belt configured to rotate; a first stretching member and a second stretching member between which the belt is stretched; a first adjustment member provided at one end side of the first adjustment member in a belt width direction that is orthogonal to a direction of rotation of the belt, the first stretching member being movable by receiving a force from the belt; a second adjustment member provided at another end side of the first stretching member in the belt width direction and being movable by receiving a force from the belt; and an interlocking device configured to interlock the movement of the first adjustment member and the movement of the second adjustment member. If the belt is laterally shifted in the belt width direction, one of the first adjustment member and the second adjustment member moves by receiving a force from the belt while the other of the first adjustment member and the second adjustment member is moved by the interlocking device such that the first stretching member is tilted with respect to the second stretching member.

According to another aspect of the present invention, a belt transporting device includes an endless belt configured to rotate, and a plurality of stretching members around which the belt is stretched. If the belt is laterally shifted toward one end side in a belt width direction that is orthogonal to a direction of rotation of the belt, the lateral shift of the belt is adjusted by tilting one of the plurality of stretching members with respect to another stretching member. The belt transporting device further includes first and second adjustment members provided at two respective ends, in the belt width direction, of the one stretching member and being movable with respect to the one stretching member when the belt is laterally shifted. If the belt is laterally shifted toward the one end side, the first adjustment member moves by receiving a force from the belt while the second adjustment member moves in a direction opposite to a direction of the movement of the first adjustment member in conjunction with the movement of the first adjustment member such that the one stretching member is tilted with respect to the other stretching member.

Further features of the present invention will become apparent from the following description of exemplary embodiments with reference to the attached drawings.

DESCRIPTION OF THE EMBODIMENTS

Referring to the attached drawings, exemplary embodiments of the present invention will now be described in detail. The dimensions, materials, and shapes of elements described in the following embodiments and the relative arrangement thereof are subject to change appropriately in accordance with configurations and conditions of devices to which the present invention is applied. Hence, the scope of the present invention is not limited to those described in the following embodiments unless specifically stated.

First Embodiment (Overall Configuration of Image Forming Apparatus)

Figure 1:
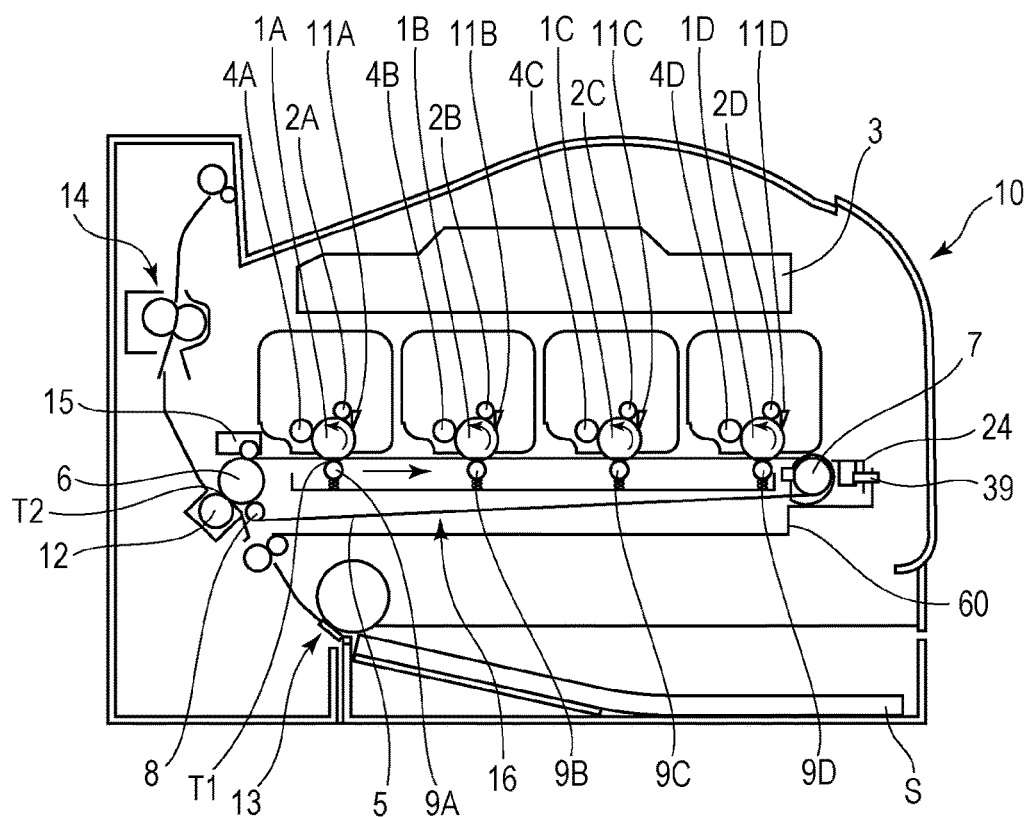
FIG. 1 schematically illustrates an image forming apparatus including a belt transporting device according to an embodiment of the present invention.

FIG. 1 schematically illustrates an exemplary color image forming apparatus. Referring to FIG. 1, a configuration of an image forming apparatus 10 according to a first embodiment will be described. The image forming apparatus 10 is capable of electrophotographically forming an image on a transfer material S, such as recording paper, an over-head-projector (OHP) sheet, or the like, in accordance with a signal transmitted thereto from an external apparatus, such as a personal computer, connected to the image forming apparatus 10 so as to be in communication therewith.

The image forming apparatus 10 includes a plurality of image forming units A, B, C, and D configured to form toner images in colors of yellow, magenta, cyan, and black, respectively. The image forming units A, B, C, and D are lined substantially horizontally. A belt transporting device is provided facing the image forming units A, B, C, and D. The belt transporting device according to the first embodiment is a transfer unit provided in the form of a unit including a belt and other members.

The transfer unit according to the first embodiment is an intermediate transfer belt unit 16 that causes an endless belt (intermediate transfer belt) 5, as an intermediate transfer member, stretched around a plurality of stretching members (a driving roller 6, a tension roller 7, and a follower roller 8) to rotate while facing the image forming units A, B, C, and D. The image forming units A, B, C, and D all have the same configuration and function in the same manner, except that the colors of toner images to be formed are different. Hence, the configuration of the image forming unit A will be described as a representative.

The image forming unit A forms a toner image by a known electrophotographic image forming process. The image forming unit A includes a cylindrical electrophotographic photoconductor as an image carrying member, i.e., a photoconductor drum 1A. The photoconductor drum 1A is rotatable in the direction indicated by the arrow illustrated in FIG. 1. An image forming operation is performed as follows. The surface of the photoconductor drum 1A that is under rotation is first charged by a charging roller 2A as a charging unit. Subsequently, a laser scanner 3 as an exposure unit emits light in accordance with a signal transmitted thereto from a computer and performs scan exposure on the photoconductor drum 1A that has been charged, whereby an electrostatic latent image is formed on the photoconductor drum 1A. The electrostatic latent image thus formed on the photoconductor drum 1A receives toner as developer from a developing roller 4A as a developing unit, thereby being visualized into a toner image. The toner image thus visualized on the photoconductor drum 1A is electrostatically transferred to the intermediate transfer belt 5 by a first transfer roller 9A as a first transfer member provided at a first transfer part T1 and across the intermediate transfer belt 5 from the photoconductor drum 1A. Residual first-transfer toner staying on the photoconductor drum 1A is removed by a cleaning device 11A and is used in the image forming process subsequent to the charging.

Through the above process, different toner images are formed on the photoconductor drums 1A, 1B, 1C, and 1D of the respective image forming units A, B, C, and D and are sequentially superposed one on top of another on the intermediate transfer belt 5 in accordance with the timing of rotation of the intermediate transfer belt 5, whereby a color toner image is formed.

Meanwhile, a transfer material S is fed from a transfer material container by a device such as a feeding device 13 and is transported, in accordance with the above timing, to a contact part (second transfer part) T2 defined between a second transfer roller 12, as a second transfer member, and the intermediate transfer belt 5. Then, the color toner image on the intermediate transfer belt 5 is electrostatically transferred to the transfer material S at the second transfer part T2 by the second transfer roller 12.

Subsequently, the transfer material S is separated from the intermediate transfer belt 5 and is transported to a fixing unit 14, where the color toner image on the transfer material S is subject to pressure and heat, thereby being firmly fixed to the transfer material S. The transfer material S is further transported and is discharged onto a discharge tray. Residual second-transfer toner staying on the intermediate transfer belt 5 is removed by a transfer-belt-cleaning device 15.

A sensor unit 24 is provided at a position across the intermediate transfer belt 5 from the tension roller 7. The sensor unit 24 is capable of detecting information on a toner patch, such as the density of the toner patch, transferred to the intermediate transfer belt 5. A control unit (controller) provided in the body of the image forming apparatus 10 is capable of controlling the density of the toner image by controlling the image forming units A, B, C, and D and the laser scanner 3 in accordance with the result of detection by the sensor unit 24.

According to the first embodiment, the intermediate transfer belt unit 16 as a transfer unit is detachably provided in the body of the image forming apparatus 10. That is, the belt transporting device is detachably provided in the body of the image forming apparatus 10. Furthermore, a group of the photoconductor drums 1A, 1B, 1C, and 1D and a group of the developing rollers 4A, 4B, 4C, and 4D included in the image forming units A, B, C, and D may each be provided in the form of a cartridge having a frame body, forming a process cartridge that is attachable to and detachable from the body of the image forming apparatus 10.

(Configuration of Intermediate Transfer Belt Unit)

Configurations of the intermediate transfer belt unit 16 and a belt-lateral-shift-adjusting mechanism will now be described with reference to FIGS. 2 to 8. The intermediate transfer belt unit 16 includes the intermediate transfer belt 5, the plurality of stretching members (the driving roller 6, the tension roller 7, and the follower roller 8) around which the intermediate transfer belt 5 is stretched, and frame members 17R and 17L that support the plurality of stretching members. The intermediate transfer belt unit 16 further includes the first transfer rollers 9A, 9B, 9C, and 9D. The intermediate transfer belt unit 16 is positioned with respect to a body frame member 60 of the image forming apparatus 10.

Figure 2:
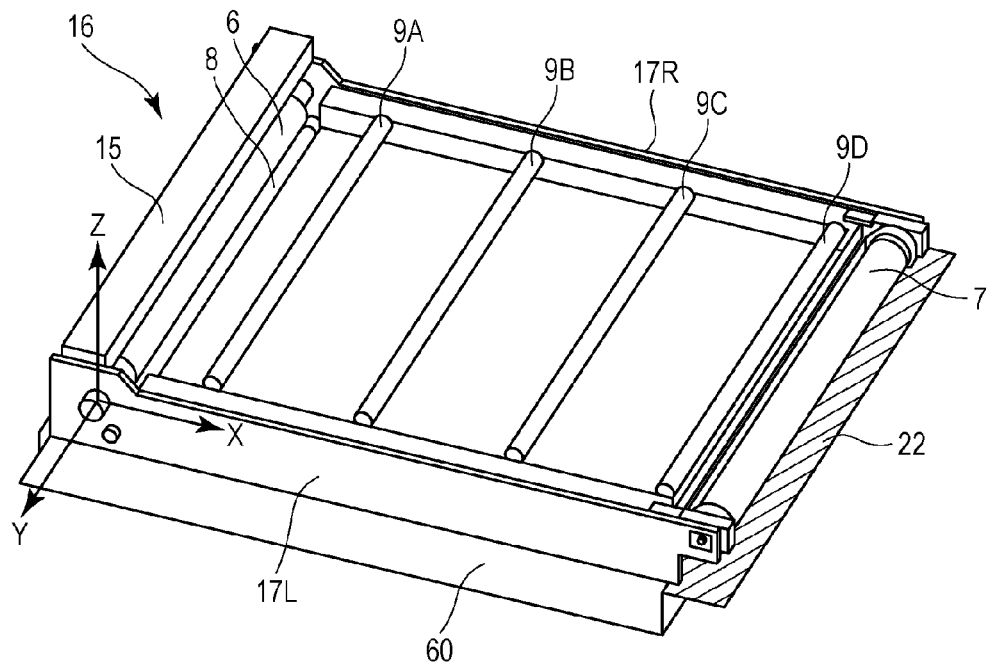
FIG. 2 is a perspective view of an intermediate transfer belt unit according to a first embodiment.

FIG. 2 is a perspective view of the intermediate transfer belt unit 16. To illustrate the internal configuration, the intermediate transfer belt 5 and the sensor unit 24 are not illustrated. The intermediate transfer belt unit 16 is provided on the body frame member 60.

Referring to FIG. 2, the driving roller 6 and the follower roller 8 are positioned with respect to the frame members 17R and 17L with respective bearings interposed therebetween. Rotational shafts of the driving roller 6 and the follower roller 8 are rotatably supported by the respective bearings. The tension roller 7 is supported by adjustment members 21R and 21L, to be described below, in such a manner as to be movable with respect to the frame members 17R and 17L. The driving roller 6 is driven to rotate by a driving device (not illustrated) and thus transports the intermediate transfer belt 5. The tension roller 7 and the follower roller 8 are in contact with the intermediate transfer belt 5 and thus follow the rotation of the intermediate transfer belt 5.

Figure 3:
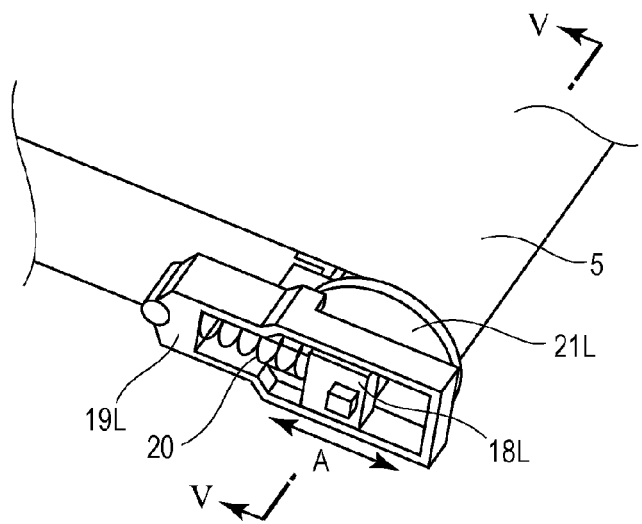
FIG. 3 is a perspective view illustrating an end of a stretching member that applies a tensile force to an intermediate transfer belt according to the first embodiment.
Figure 4:
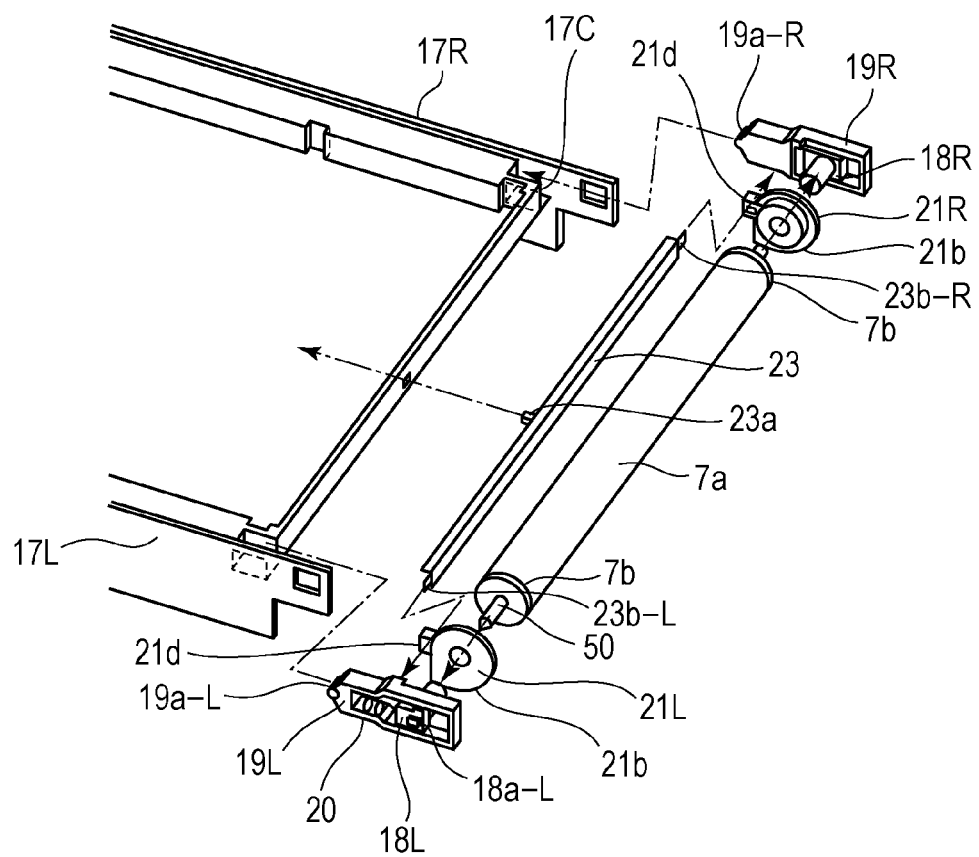
FIG. 4 is an exploded perspective view illustrating elements included in a belt-lateral-shift-adjusting mechanism according to the first embodiment.
Figure 5A:
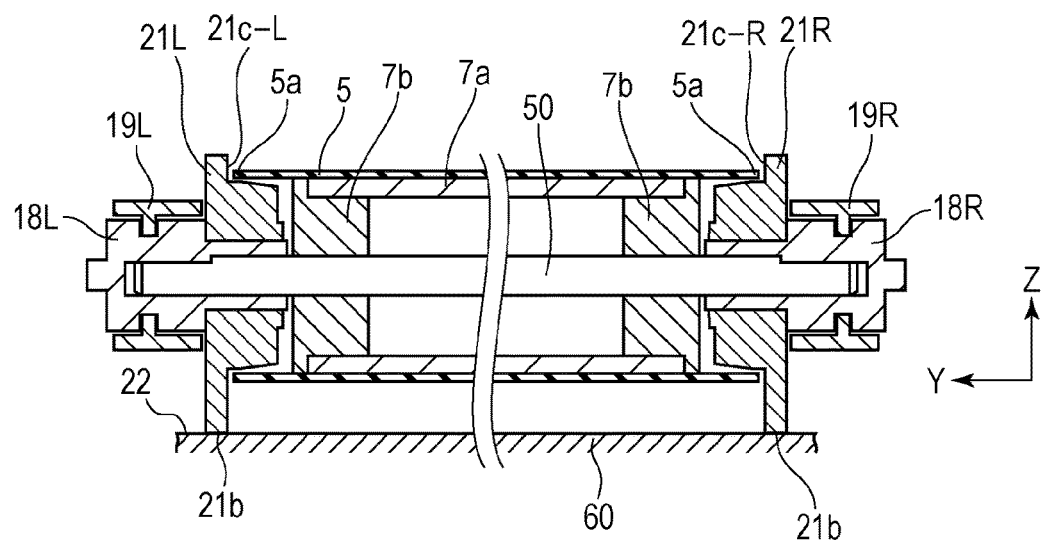
FIGS. 5A and 5B are sectional views of the belt-lateral-shift-adjusting mechanism taken along line V-V illustrated in FIG. 3.
Figure 5B:
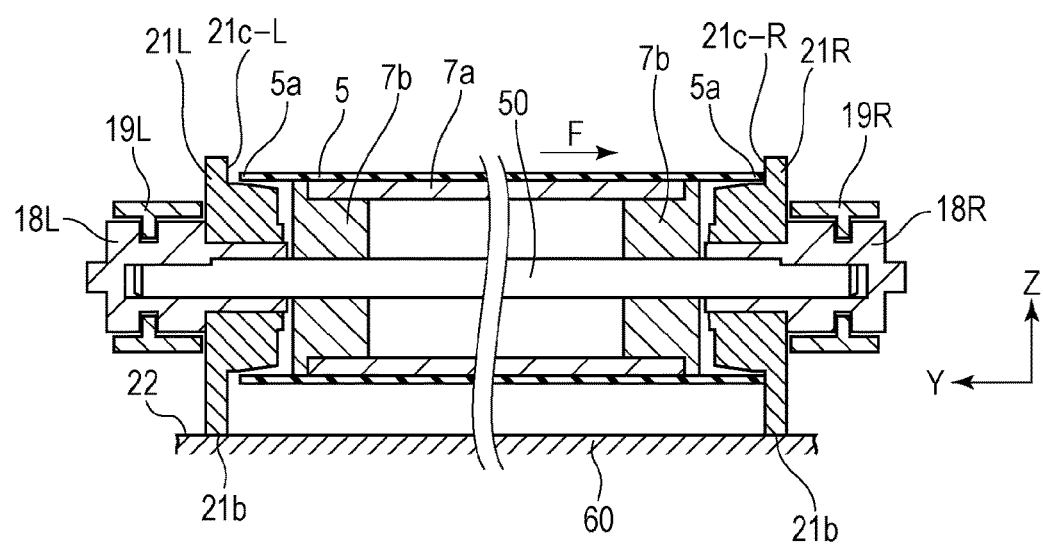

Referring to FIGS. 3 to 5B, a mechanism of applying a tensile force to the intermediate transfer belt 5 will now be described. FIG. 3 is a perspective view illustrating an end (on an L side) of the tension roller 7, which is configured to apply a tensile force to the intermediate transfer belt 5. FIG. 4 is an exploded perspective view illustrating elements included in the belt-lateral-shift-adjusting mechanism. FIGS. 5A and 5B are sectional views of the belt-lateral-shift-adjusting mechanism taken along line V-V illustrated in FIG. 3.

As illustrated in FIG. 3, a tension roller bearing 18L engages with a tension-roller-bearing holder 19L in such a manner as to be slidable in the direction of arrow A. The tension roller bearing 18L urges the tension roller 7 via a tension roller shaft 50 of the tension roller 7 in such a manner as to apply a tensile force to the intermediate transfer belt 5 with the aid of an urging member (a tension spring 20) provided between the tension roller bearing 18L and the tension-roller-bearing holder 19L. The other end (on an R side) of the tension roller 7 has the same configuration, and description thereof is omitted.

As illustrated in FIGS. 4 and 5A and 5B, the tension roller 7 includes a tension roller sleeve 7a, a tension roller flanges 7b, and the tension roller shaft 50, all of which rotate together. The tension roller shaft 50 is supported at two ends thereof by the tension roller bearing 18L and a tension roller bearing 18R, respectively, which correspond to bearing supporting members.

The belt-lateral-shift-adjusting mechanism that functions if the intermediate transfer belt 5 is laterally shifted toward one end side in a belt width direction that is orthogonal to a direction of belt rotation will now be described. The belt-lateral-shift-adjusting mechanism according to the first embodiment includes at least the tension roller 7 and the adjustment members 21R and 21L. The adjustment members 21R and 21L correspond to a first adjusting member and a second adjusting member. The adjustment members 21R and 21L have the same configuration. Therefore, one of the adjustment members 21R and 21L that comes into contact with the intermediate transfer belt 5 when the intermediate transfer belt 5 is laterally shifted is herein defined as the first adjustment member, and the other is defined as the second adjustment member. The belt-lateral-shift-adjusting mechanism adjusts any lateral shift of the intermediate transfer belt 5 by tilting one of the stretching members (the driving roller 6, the tension roller 7, and the follower roller 8) with respect to another. In the first embodiment, the stretching member that is tilted with respect to another stretching member is defined as the first stretching member. As described above, the first stretching member according to the first embodiment is the tension roller 7.

The adjustment members 21R and 21L are movable by receiving a force from the intermediate transfer belt 5 and are provided at the two respective ends of the tension roller 7 as illustrated in FIG. 4. Specifically, the adjustment members 21R and 21L are each a cam and, if the intermediate transfer belt 5 is laterally shifted in the belt width direction, rotate in the direction of rotation of the intermediate transfer belt 5 (hereinafter also referred to as the direction of belt rotation) by coming into contact with the intermediate transfer belt 5. The adjustment members 21R and 21L have respective curved cam surfaces 21b that are in contact with a frictional surface 22 of the body frame member 60 (see FIGS. 1 and 2). The adjustment members 21R and 21L are supported by and rotatably engage with the respective tension roller bearings 18R and 18L. Hence, the axes of rotation of the adjustment members 21R and 21L coincide with the axis of rotation of the tension roller 7. The frictional surface 22 lies below the tension roller 7 as illustrated in FIG. 2 and faces the tension roller 7 as illustrated in FIGS. 5A and 5B. The frictional surface 22 may be included in either the body frame member 60 or the intermediate transfer belt unit 16.

As illustrated in FIGS. 5A and 5B, the positions of the tension roller bearings 18R and 18L, the tension roller shaft 50, and the tension roller 7 in the Z direction (hereinafter referred to as height direction) are determined by the frictional surface 22 and the adjustment members 21R and 21L.

Figure 6:
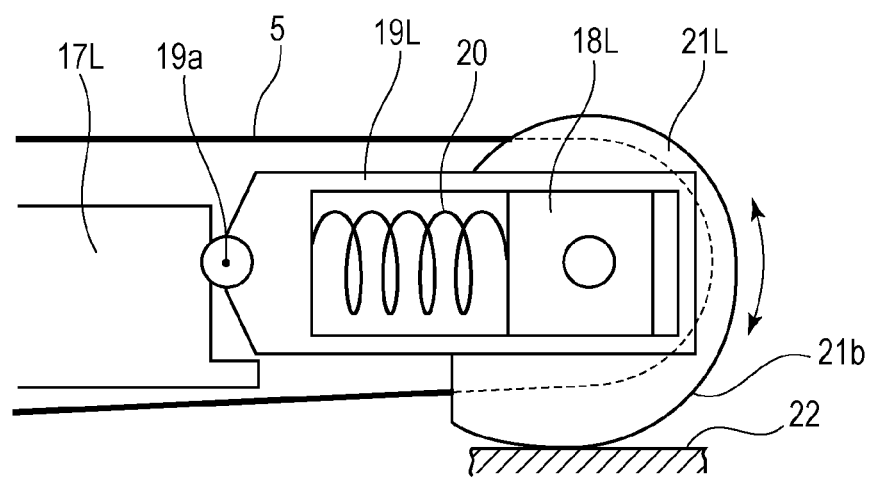
FIG. 6 is a side view illustrating a part of the belt-lateral-shift-adjusting mechanism according to the first embodiment.

FIG. 6 is a side view illustrating the L side of the belt-lateral-shift-adjusting mechanism. The R side of the mechanism has the same configuration as in FIG. 6, and description thereof is omitted. As illustrated in FIG. 6, the tension-roller-bearing holder 19L is held by the frame member 17L in such a manner as to be swingable about a bearing-holder point of support 19a by a predetermined angle. That is, the tension-roller-bearing holder 19L holding the tension spring 20 is capable of following the position of the tension roller 7 in the height direction that is defined by the adjustment member 21L.

Figure 7A:
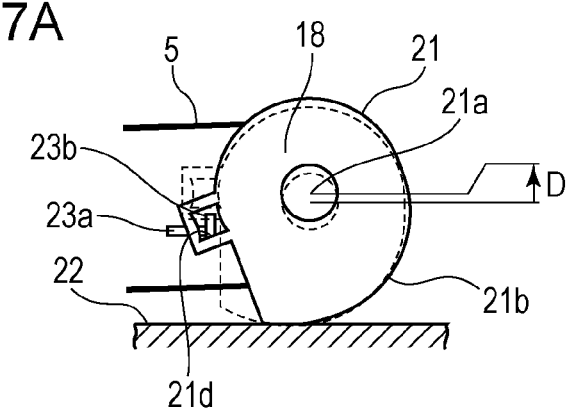
FIGS. 7A to 7C illustrate movements of an adjustment member included in the belt-lateral-shift-adjusting mechanism according to the first embodiment.
Figure 7B:
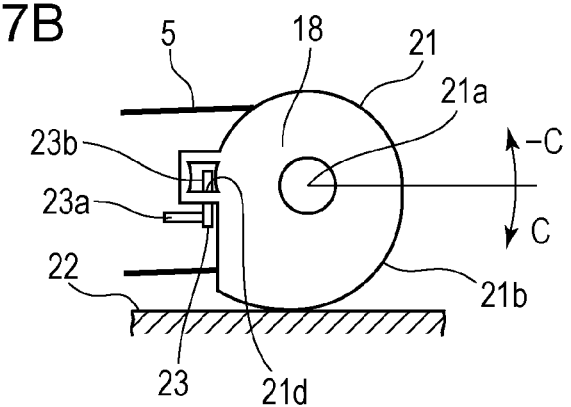
Figure 7C:
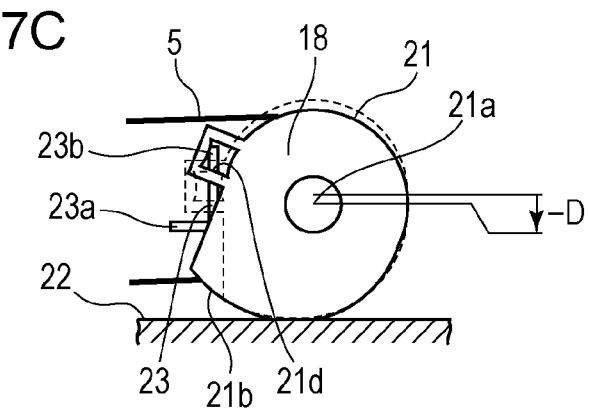

FIGS. 7A to 7C illustrate the relationship between the movement of the adjustment member 21L and the movement of the tension roller 7. As described above, the curved cam surface 21b of the adjustment member 21L is in contact with the frictional surface 22, which is a fixed surface. The cam, i.e., the adjustment member 21L, has such a shape that the height of the tension roller bearing 18L continuously changes with the rotational phase of the adjustment member 21L. Specifically, if the adjustment member 21L that is in a state illustrated in FIG. 7B rotates in the direction of transport by the intermediate transfer belt 5 (in the direction of arrow C), the cam functions in such a manner as to lower the tension roller bearing 18L (as illustrated in FIG. 7C). If the adjustment member 21L that is in the state illustrated in FIG. 7B rotates in a direction (the direction of arrow-C) opposite to the direction of belt rotation, the cam functions in such a manner as to lift the tension roller bearing 18L (as illustrated in FIG. 7A).

Figure 8:
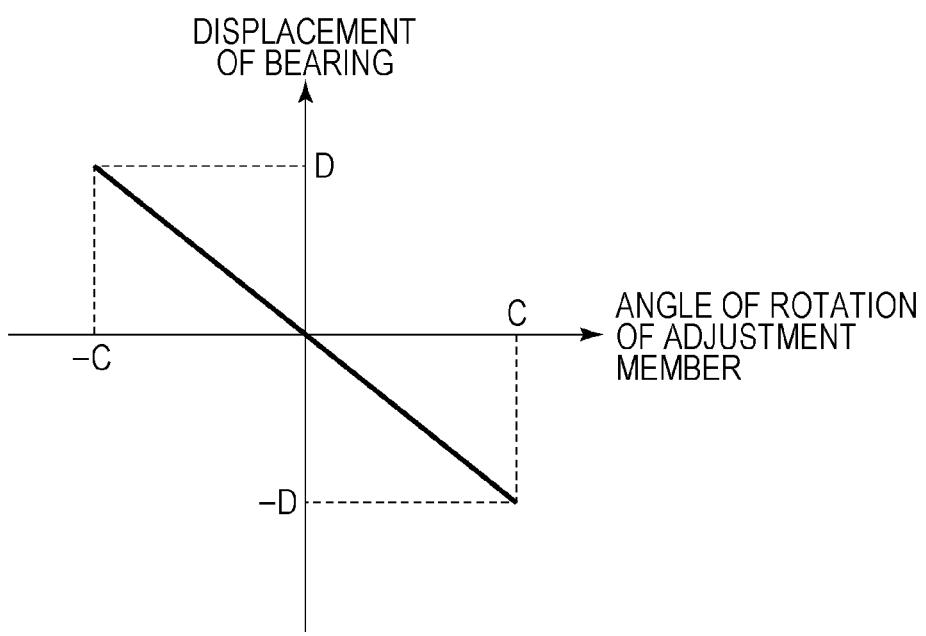
FIG. 8 is a graph illustrating the angle of rotation of the adjustment member and the displacement of a bearing in the first embodiment.

FIG. 8 is a graph illustrating the angle of rotation of the adjustment member 21R or 21L and the displacement of a corresponding one of the tension roller bearings 18R and 18L. The relationship between the angle of rotation of the adjustment member 21R or 21L and the displacement of a corresponding one of the tension roller bearings 18R and 18L is substantially as illustrated in FIG. 8. The tension roller shaft 50 that are supported by the tension roller bearings 18R and 18L and the tension roller 7 are also displaced by following the tension roller bearings 18R and 18L.

If the intermediate transfer belt 5 is laterally shifted in the belt width direction, one of the adjustment members 21R and 21L is moved toward one end side in the belt width direction by a force transmitted thereto from the intermediate transfer belt 5. In conjunction with such a movement, the other of the adjustment members 21R and 21L moves toward the other end side.

In the first embodiment, as illustrated in FIG. 4, the adjustment members 21R and 21L are connected to each other with a connecting member (link member 23) provided as an interlocking device. A link-member support pin 23a included in the link member 23 is supported by a frame member 17C in such a manner as to be swingable substantially at the center of the link member 23 in the width direction of the intermediate transfer belt 5. The link member 23 includes adjustment-member-engaging portions 23b-R and 23b-L. The adjustment-member-engaging portions 23b-R and 23b-L engage with link-member-engaging portions 21d, respectively, included in the respective adjustment members 21R and 21L. The link-member-engaging portions 21d of the adjustment members 21R and 21L are provided on the upstream side in the direction of belt rotation with respect to the tension roller shaft 50. If one of the adjustment members 21R and 21L is rotated in a certain direction (the direction of arrow C) by the link member 23, the other of the adjustment members 21R and 21L is rotated by the link member 23 by substantially the same angle but in the opposite direction (the direction of arrow-C).

(Adjustment of Lateral Shift of Belt)

Figure 9A:
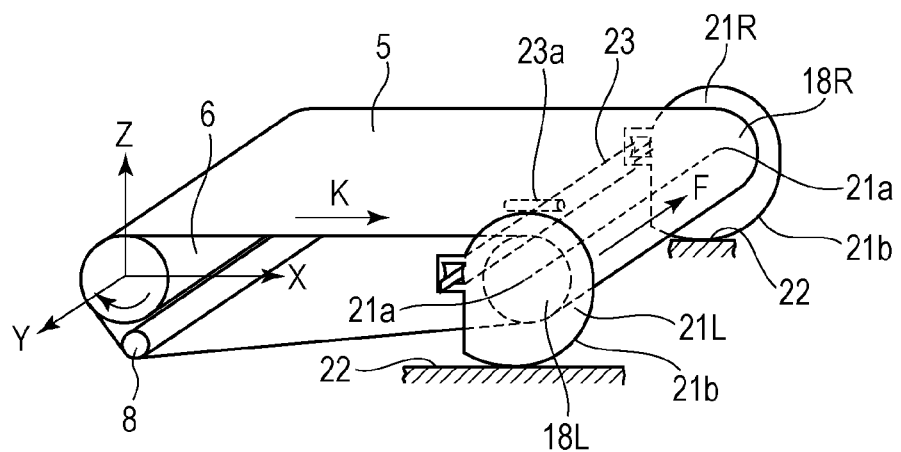
FIGS. 9A and 9B illustrate an operation of the belt-lateral-shift-adjusting mechanism according to the first embodiment.
Figure 9B:
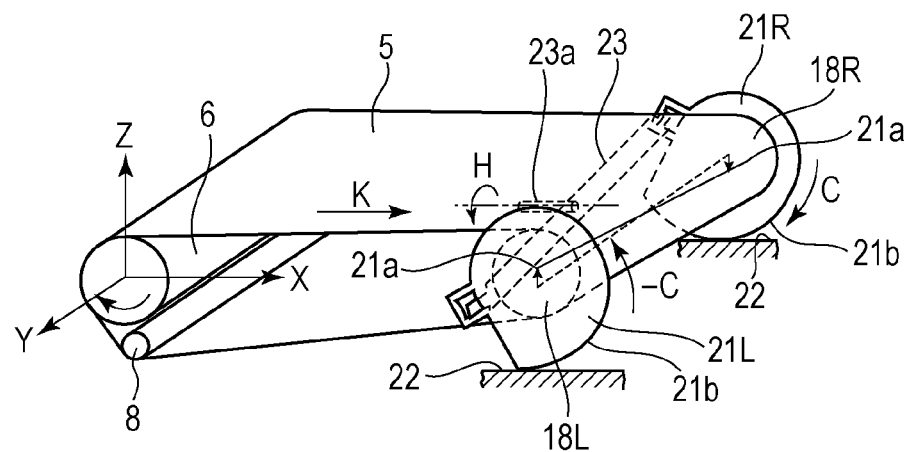

FIGS. 9A and 9B illustrate an operation of the belt-lateral-shift-adjusting mechanism. Referring to FIGS. 5A, 5B, 9A, and 9B, a lateral shift adjusting operation performed by the belt transporting device according to the first embodiment will now be described.

As illustrated in FIG. 9A, the intermediate transfer belt 5 is transported in the direction of arrow K by the driving roller 6. First, an adjusting operation performed in a case where the intermediate transfer belt 5 is laterally shifted in the direction of arrow F will be described.

If the intermediate transfer belt 5 is laterally shifted in the direction of arrow F, one of belt ends 5a comes into contact with a belt rubbing surface 21c-R of the adjustment member 21R, whereby the intermediate transfer belt 5 is prevented from laterally shifting in the direction of arrow F (see FIG. 5B). Since the intermediate transfer belt 5 is prevented from laterally shifting, a contact pressure is produced between the belt end 5a and the belt rubbing surface 21c-R. This contact pressure is herein referred to as lateral-shift force. In a configuration not including the belt-lateral-shift-adjusting mechanism, if the lateral-shift force increases, the load applied to the belt end 5a increases, leading to possible damage to the intermediate transfer belt 5.

In the belt transporting device, if the belt end 5a comes into contact with the belt rubbing surface 21c-R of the adjustment member 21R, the belt end 5a causes the adjustment member 21R to rotate in the direction of rotation of the intermediate transfer belt 5 (in the direction of arrow C), as illustrated in FIG. 9B, with a frictional force produced by the lateral-shift force. With the rotation of the adjustment member 21R in the direction of arrow C, an end of the tension roller 7 on the side (R side) toward which the intermediate transfer belt 5 is laterally shifted is lowered. Simultaneously, the adjustment member 21R causes the link member 23 connected thereto to swing about the link-member support pin 23a, and the link member 23 causes the adjustment member 21L on the other side to rotate in the direction (the direction of arrow-C) opposite to the direction of belt rotation. With the rotation of the adjustment member 21L, the end of the tension roller 7 on the side (L side) opposite the side toward which the intermediate transfer belt 5 is laterally shifted is lifted.

In such a manner, the tension roller 7 is tilted with respect to the driving roller 6. The two ends of the tension roller 7 are displaced by the link member 23 by substantially the same amount but in the opposite directions. That is, the tension roller 7 is tilted in the belt width direction and symmetrically with respect to the link-member support pin 23a.

In the belt transporting device according to the first embodiment, the intermediate transfer belt 5 is moved in a direction opposite to the direction of initial lateral shift (the direction of arrow F) by tilting the tension roller 7, whereby the lateral shift of the intermediate transfer belt 5 is adjusted, and the lateral-shift force is reduced. When the lateral-shift force exerted by the intermediate transfer belt 5 becomes sufficiently small, the belt end 5a loses the force of rotating the adjustment member 21R, stopping the rotation of the adjustment member 21R. Simultaneously with the stoppage of the rotation of the adjustment member 21R, the adjustment member 21L stops rotating. After the adjustment members 21R and 21L stop rotating, the adjustment members 21R and 21L retain their respective positions (phases).

As described above, in the belt-lateral-shift-adjusting mechanism according to the first embodiment, if any lateral shift of the intermediate transfer belt 5 occurs, the adjustment members 21R and 21L operate in conjunction with each other in such a manner as to tilt the tension roller 7 by rotating in the opposite directions. In the configuration according to the first embodiment, the tension roller 7 is easier to tilt than in a configuration including only one adjustment member.

Figure 10:
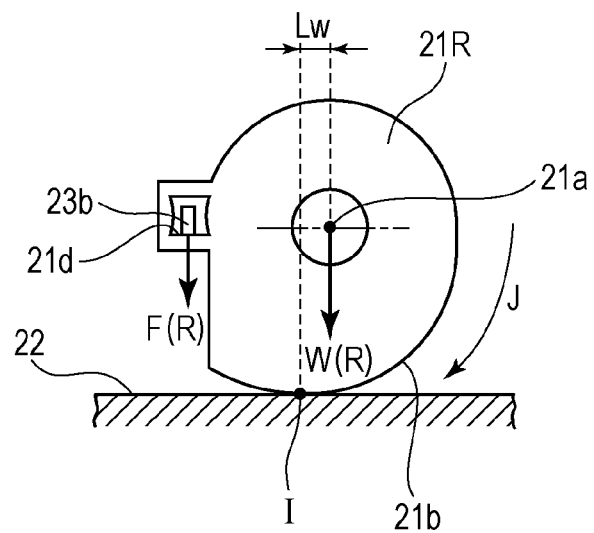
FIG. 10 illustrates forces that act on an adjustment member that is not connected to a connecting member.

FIG. 10 illustrates forces that act on the adjustment member 21R in a state of not being connected to the link member 23. A point I is a contact point between the adjustment member 21R and the frictional surface 22. An axis 21a is the center of rotation of the adjustment member 21R and is at a distance Lw from the point I in the horizontal direction.

The adjustment member 21R is in contact with the frictional surface 22 at the point I. A weight W(R) of the tension roller 7 acts on the axis 21a, which is staggered from the point I by the distance Lw. Hence, the adjustment member 21R receives a force that rotates the adjustment member 21R in the direction of arrow J. The same applies to the adjustment member 21L on the other side. That is, in a state where the adjustment members 21R and 21L are freely rotatable, the adjustment members 21R and 21L both rotate in the direction of arrow J while the tension roller bearings 18R and 18L both rotate as illustrated in FIG. 7C under their own weights. Therefore, a mechanism that rotates the tension roller bearings 18R and 18L in a direction opposite to direction of arrow J is required. For example, to rotate the tension roller bearings 18R and 18L in the direction opposite to the direction of arrow J, urging members such as tension springs or the like may be employed.

Figure 11:
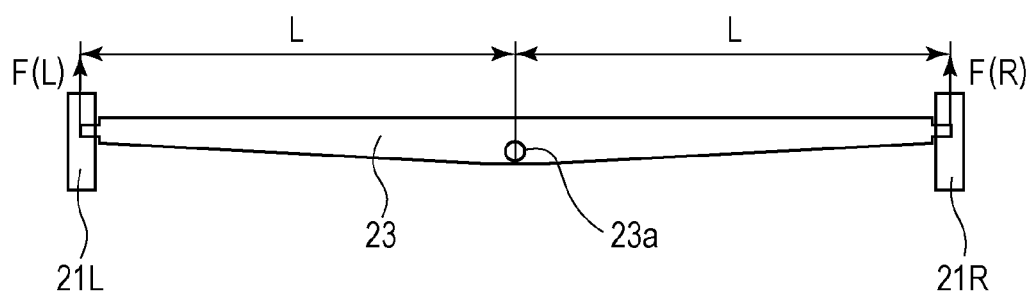
FIG. 11 illustrates the relationship between a swing pin of the connecting member and the adjustment member.

In the first embodiment, however, no urging members such as tension springs are necessary. As illustrated in FIG. 11, the adjustment members 21R and 21L are provided at respective positions that are substantially symmetrical to each other with respect to the link-member support pin 23a. The adjustment members 21R and 21L are subject to substantially equal shares of the weight of the tension roller 7 and substantially equal rotational moments. This shows that, in a state where no lateral-shift force is applied to the intermediate transfer belt 5, the rotational moments applied to the adjustment members 21R and 21L on the two respective sides balance out with respect to the link member 23, whereby the adjustment members 21R and 21L are kept stationary. That is, in the first embodiment, the tilt of the tension roller 7 is maintainable independently of the forces that are applied thereto from the intermediate transfer belt 5 and the urging members such as tension springs.

Moreover, the link member 23 is capable of maintaining a state where the angle of rotation of one of the adjustment members 21R and 21L and the angle of reverse rotation of the other of the adjustment members 21R and 21L are substantially the same and, therefore, the rotational moments of the adjustment members 21R and 21L balance out.

Furthermore, in the first embodiment, the adjustment members 21R and 21L do not need to be rotated against the urging forces exerted by the tension springs. Therefore, the adjustment members 21R and 21L are rotatable with small loads.

(Position of Bearing-Holder Point of Support 19a)

The belt-lateral-shift-adjusting mechanism according to the first embodiment starts a belt-lateral-shift-adjusting operation by the intermediate transfer belt 5 rotating the adjustment members 21R and 21L. Hence, to minimize the load to be applied to the intermediate transfer belt 5, the rotational loads to be applied to the adjustment members 21R and 21L may be reduced.

The curved cam surfaces 21b of the respective adjustment members 21R and 21L rub against the frictional surface 22. That is, if the frictional forces between the frictional surface 22 and the curved cam surfaces 21b are reduced, the rotational loads to be applied to the adjustment members 21R and 21L can be reduced. The frictional forces produced between the frictional surface 22 and the curved cam surfaces 21b are mainly dominated by the normal reaction force produced by the weight of the tension roller 7 and the tensile force of the intermediate transfer belt 5 and by the coefficients of friction between the frictional surface 22 and the curved cam surfaces 21b. Hence, the normal reaction force and the coefficients of friction may be reduced.

Figure 12A:
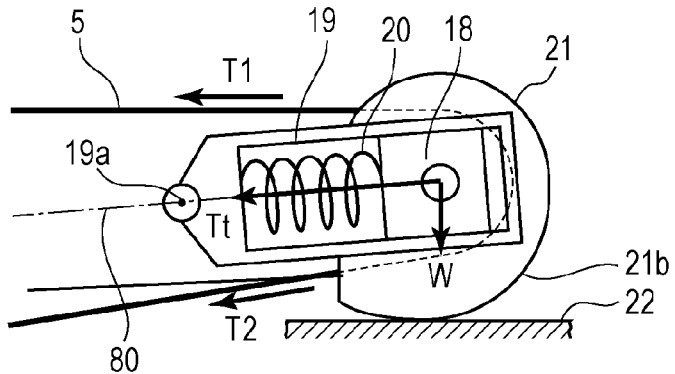
FIGS. 12A to 12C illustrate the point of support of a bearing supporting member.
Figure 12B:
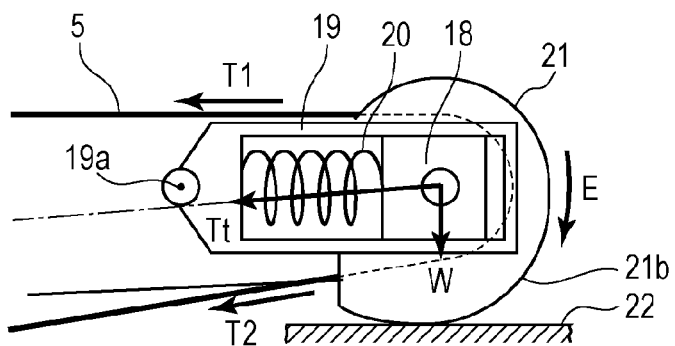
Figure 12C:
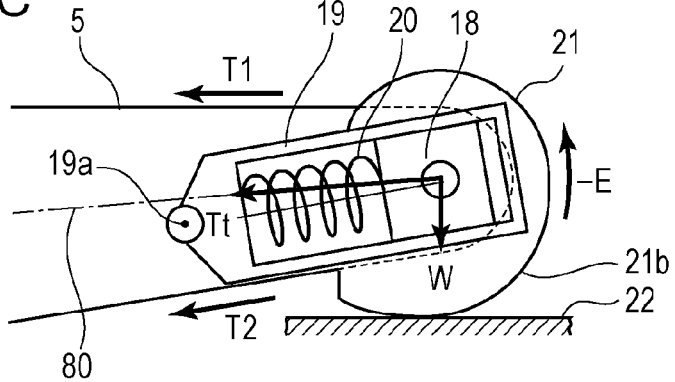

In the first embodiment, the positions of the tension-roller-bearing holders 19R and 19L are adjusted to reduce the rotational loads applied to the adjustment members 21R and 21L. FIGS. 12A to 12C are sectional views illustrating the position of one of the tension-roller-bearing holders 19R and 19L (hereinafter also simply denoted by 19). The tension-roller-bearing holder 19 holds the tension spring 20, the tension roller bearing 18, and the tension roller 7, which are rotatable together about the bearing-holder point of support 19a depending on the position of the tension roller 7. The tension spring 20 is capable of constantly pressing substantially the center of the tension roller 7, regardless of the position of the tension roller 7, so that the tension spring 20 does not hinder the belt-lateral-shift-adjusting operation.

Considering the force required for tilting the tension roller 7, the tension roller 7 is tiltable with a smaller forces by moving an end of the tension roller 7 than by moving the center of the tension roller 7. In the first embodiment, since the adjustment members 21R and 21L are provided at the two respective ends of the tension roller 7, the adjustment members 21R and 21L are capable of tilting the tension roller 7 with a small force.

The tension roller 7 is subject to a resultant force Tt resulting from tensile forces T1 and T2 exerted by the intermediate transfer belt 5 and is supported by the tension-roller-bearing holders 19.

As illustrated in FIG. 12A, if the bearing-holder point of support 19a is on the extension of the vector of the resultant force Tt, no rotational moment acts on the tension-roller-bearing holder 19. On the other hand, as illustrated in FIG. 12B, if the bearing-holder point of support 19a is above the extension of the vector of the resultant force Tt, a rotational moment in the direction of arrow E about the bearing-holder point of support 19a acts on the tension-roller-bearing holder 19. The magnitude of the rotational moment is determined in accordance with the distance between the extension of the vector of the resultant force Tt and the bearing-holder point of support 19a. In contrast, if the bearing-holder point of support 19a is below the extension of the vector of the resultant force Tt as illustrated in FIG. 12C, a rotational moment in the direction of arrow-E acts on the tension-roller-bearing holder 19 with the tensile forces T1 and T2.

The above rotational moment acts on the normal reaction force produced between each curved cam surface 21b and the frictional surface 22. That is, if the position of the bearing-holder point of support 19a is changed, the contact pressure between the frictional surface 22 and the curved cam surface 21b of each of the adjustment members 21R and 21L can be set appropriately.

If the rotational load applied to the tension roller 7 is small, the direction of the vector of the resultant force Tt resulting from the tensile forces T1 and T2 substantially coincides with a bisector 80 of the intermediate transfer belt 5 in the stretching direction.

In the first embodiment, the bearing-holder point of support 19a is set below the bisector 80 of the arc of contact between the intermediate transfer belt 5 and the tension roller 7. That is, the bearing-holder point of support 19a is set below the extension of the vector of the resultant force Tt resulting from the tensile forces T1 and T2. Furthermore, a moment in the direction of arrow-E acts on the tension-roller-bearing holder 19. Hence, the weight of the tension roller 7 is offset by the tensile forces T1 and T2 of the intermediate transfer belt 5. Accordingly, the frictional force between the frictional surface 22 and each of the curved cam surfaces 21b is reduced, and the rotational load applied to each of the adjustment members 21R and 21L is reduced. Consequently, the lateral shift of the intermediate transfer belt 5 is adjustable without applying a large load to the intermediate transfer belt 5.

(Regulation of Position of Tension Roller in Belt Width Direction)

Figure 23:
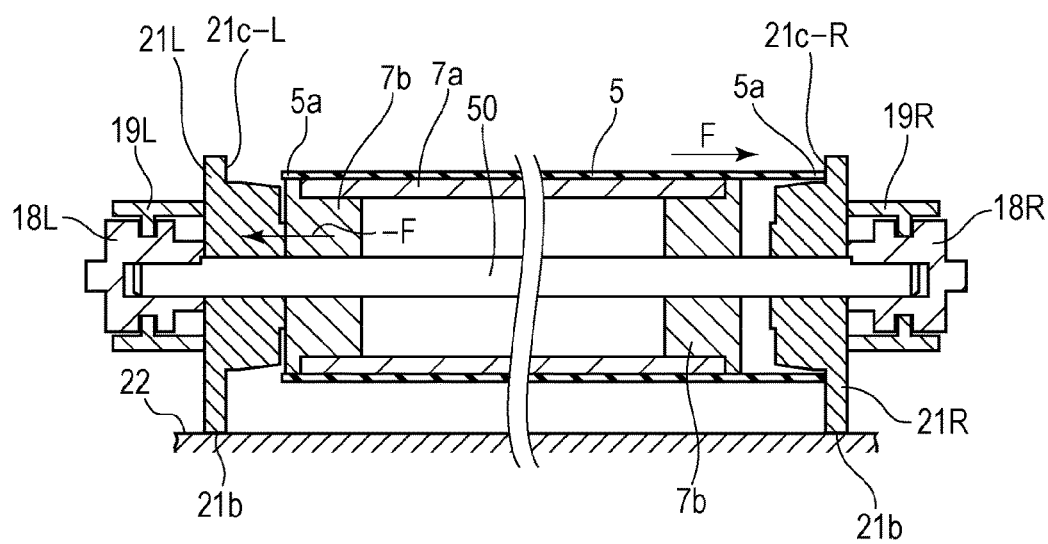
FIG. 23 is a schematic sectional view illustrating the relationship between the movement of the stretching member in a belt width direction and the adjustment member.

A method of regulating the position of the tension roller 7 in the belt width direction will now be described. If any lateral-shift force in the belt width direction occurs on the intermediate transfer belt 5, the tension roller 7, which is subject to a reaction force with respect to the lateral-shift force of the intermediate transfer belt 5, may be moved in a direction opposite to the direction in which the intermediate transfer belt 5 is laterally shifted. FIG. 23 illustrates the relationship between the tension roller flanges 7b of the tension roller 7 and the adjustment members 21R and 21L.

As described above, the tension roller 7 includes the tension roller sleeve 7a, the tension roller flanges 7b, and the tension roller shaft 50 that are configured to rotate together. The tension roller shaft 50 is rotatably supported by the tension roller bearings 18R and 18L, corresponding to the bearing supporting members, provided at the two respective ends thereof. Referring to FIG. 23, if the intermediate transfer belt 5 is laterally shifted in the direction of arrow F, the adjustment member 21R receives a moving force from the intermediate transfer belt 5 and tends to move in the direction of belt rotation. In such a situation, if the tension roller 7 is moved in the direction of arrow-F by the reaction force with respect to the lateral-shift force, the adjustment member 21L facing a corresponding one of the tension roller flanges 7b may come into contact with the intermediate transfer belt 5.

As described above, when the adjustment member 21R rotates in the direction of belt rotation, the link member 23 functions such that the adjustment member 21L tends to rotate in the direction opposite to the direction of belt rotation. If the adjustment member 21L is subject to a force acting in the direction of belt rotation from the tension roller flange 7b that is in contact therewith as illustrated in FIG. 23, the movement of the adjustment member 21L realized by the link member 23 is hindered. Consequently, the belt-lateral-shift-adjusting mechanism may not work properly.

Even without the link member 23, if the tension roller 7 is moved in the belt width direction, the belt-lateral-shift-adjusting mechanism may not work properly. This is because of the following reason. In a case where the lateral shift is adjusted by rotating the adjustment member 21R in the direction of belt rotation and thus lowering the R side of the tension roller 7 with respect to the L side, if the adjustment member 21L also rotates in the direction of belt rotation, the L side of the tension roller 7 is also lowered, making it difficult to tilt the tension roller 7 as intended.

Hence, in the first embodiment, the tension roller flanges 7b of the tension roller 7 are out of contact with the adjustment members 21R and 21L.

Figure 24A:
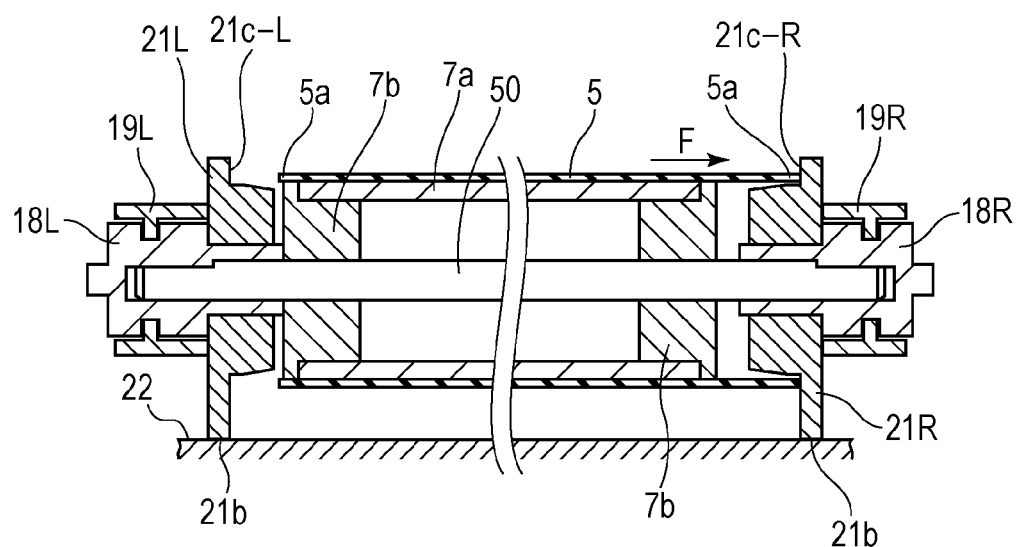
FIGS. 24A and 24B are schematic sectional views illustrating a regulating portion provided between the stretching member and the adjustment member.
Figure 24B:
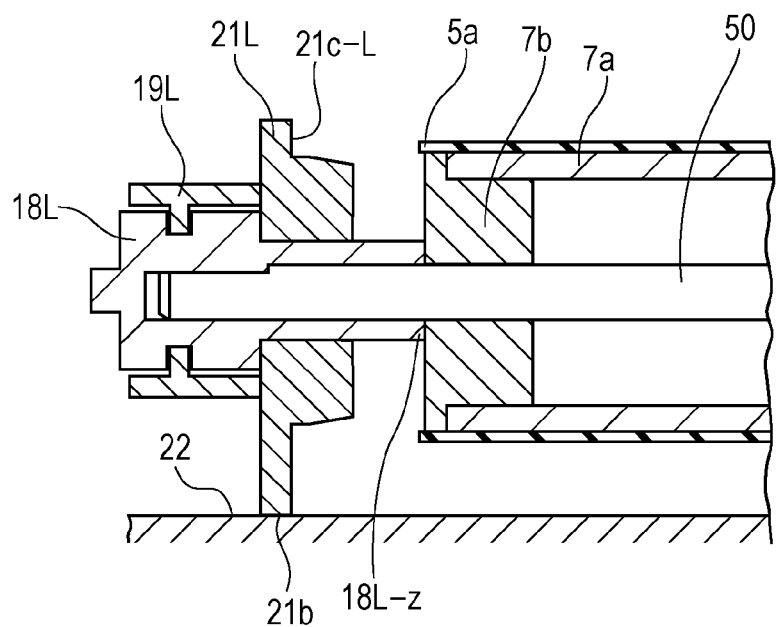

FIG. 24A illustrates a state where the intermediate transfer belt 5 is laterally shifted in the direction of arrow F. FIG. 24B is an enlargement of the L side illustrated in FIG. 24A.

The tension roller bearing 18L includes a regulating portion 18L-z that is in contact with the tension roller flange 7b. The regulating portion 18L-z prevents the tension roller flange 7b from moving in the direction of arrow-F beyond the regulating portion 18L-z and thus prevents the adjustment member 21L and the tension roller flange 7b from interfering with each other. Thus, if the intermediate transfer belt 5 is laterally shifted in the direction of arrow F, the adjustment member 21L is rotated in the direction opposite to the direction of belt rotation by the link member 23 without being affected by the rotational force acting in the direction of belt rotation.

Figure 25:
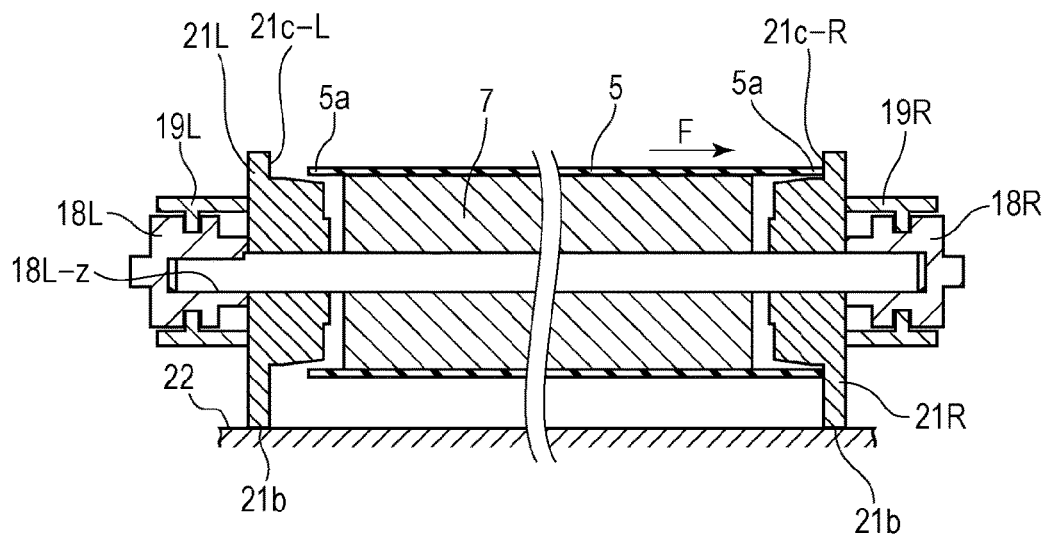
FIG. 25 is a schematic sectional view illustrating the relationship between a shaft of the stretching member and the regulating portion.

Referring to FIG. 25, the tension roller 7 and the tension roller shaft 50 may be provided as an integral body while being rotatable with respect to the tension roller bearings 18R and 18L. In such a case also, the position of the tension roller 7 in the belt width direction can be regulated by using the tension roller bearings 18R and 18L. For example, as illustrated in FIG. 25, if the intermediate transfer belt 5 is laterally shifted in the direction of arrow F and the tension roller 7 tends to move in the direction of arrow-F, the position of the tension roller 7 in the belt width direction can be regulated by the regulating portion 18L-z of the tension roller bearing 18L.

Hence, the belt-lateral-shift-adjusting mechanism according to the first embodiment is capable of regulating the lateral shift of the intermediate transfer belt 5 while regulating the movement of the tension roller 7 in the belt width direction.

Example

Results of a belt-lateral-shift-adjusting operation that was actually performed by using the above mechanism will now be described.

Figure 13A:
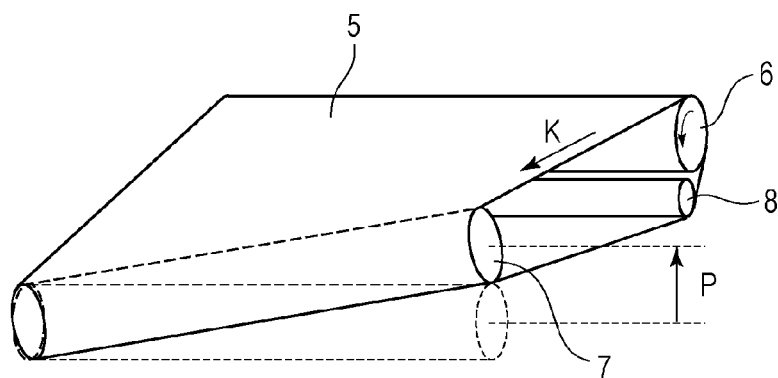
FIGS. 13A and 13B illustrate the results of an experiment demonstrating advantageous effects produced by the belt-lateral-shift-adjusting mechanism according to the first embodiment.

FIG. 13A illustrates the amount of torsion. As illustrated in FIG. 13A, the tension roller 7 was tilted on one side from a position represented by dotted lines, whereby the intermediate transfer belt 5 was laterally shifted. A height P at the end of the tension roller 7 was defined as the amount of torsion.

In the belt-lateral-shift-adjusting operation, the lateral-shift force of the intermediate transfer belt 5 was measured. The lateral-shift force was measured by measuring the force with which the intermediate transfer belt 5 pushed the adjustment member 21R or 21L when the intermediate transfer belt 5 was laterally shifted. The measurement was performed with a load cell (model: LMA-A-20N M81 of Kyowa Electronic Instruments, Co., Ltd.).

Figure 13B:
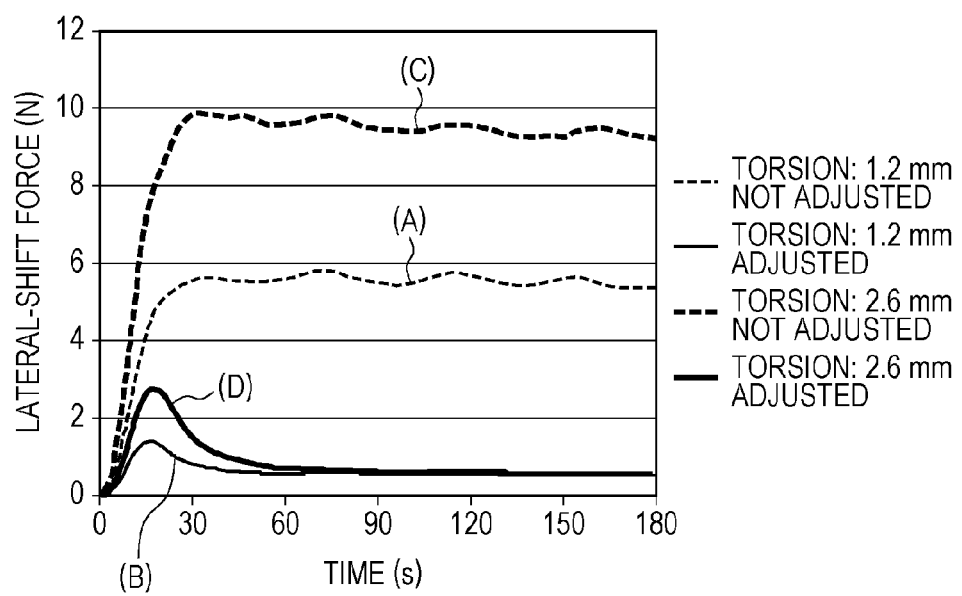

FIG. 13B is a graph summarizing the results of the belt-lateral-shift-adjusting operation performed by the intermediate transfer belt unit 16. The horizontal axis represents time. The vertical axis represents lateral-shift force. On the horizontal axis, the time the intermediate transfer belt 5 started to come into contact with the adjustment member 21R or 21L is defined as zero. The lateral-shift force was measured in four cases. Specifically, in each of two cases where the torsion was 1.2 mm and 2.6 mm, the lateral-shift force was measured with an intermediate transfer belt unit including the belt-lateral-shift-adjusting mechanism and an intermediate transfer belt unit not including the belt-lateral-shift-adjusting mechanism. Thin broken line (A) represents the lateral-shift force measured in the case where the torsion was 1.2 mm without the belt-lateral-shift-adjusting mechanism. Thin solid line (B) represents the lateral-shift force measured in the case where the torsion was 1.2 mm with the belt-lateral-shift-adjusting mechanism. Bold broken line (C) represents the lateral-shift force measured in the case where the torsion was 2.6 mm without the belt-lateral-shift-adjusting mechanism. Bold solid line (D) represents the lateral-shift force measured in the case where the torsion was 2.6 mm with the belt-lateral-shift-adjusting mechanism.

In the intermediate transfer belt unit not including the belt-lateral-shift-adjusting mechanism, the lateral-shift force (in the unit of N) gradually increased and settled at about 6 N when the torsion was 1.2 mm and at about 10 N when the torsion was 2.6 mm. In contrast, in the intermediate transfer belt unit including the belt-lateral-shift-adjusting mechanism according to the first embodiment, the lateral-shift force settled at below 1 N both when the torsion was 1.2 mm and when the torsion was 2.6 mm.

Hence, the belt-lateral-shift-adjusting mechanism according to the first embodiment is capable of adjusting the lateral shift of the intermediate transfer belt 5 with a reduced load applied to the intermediate transfer belt 5, and suppresses the occurrence of damage to the intermediate transfer belt 5 even after continuous rotation of the intermediate transfer belt 5.

Second Embodiment

The first embodiment concerns a configuration in which the adjustment member 21R or 21L receives a lateral-shift force from a corresponding one of the belt ends 5a of the intermediate transfer belt 5 and is thus rotated. A second embodiment concerns a configuration in which the adjustment member 21R or 21L receives a lateral-shift force from a corresponding one of position regulating ribs 35R and 35L provided on the inner circumferential side of the intermediate transfer belt 5 at the two respective ends in the belt width direction and is thus rotated. The other elements according to the second embodiment are the same as those included in the image forming apparatus 10 according to the first embodiment and are denoted by the same reference numerals, respectively, used in the first embodiment.

Figure 14:
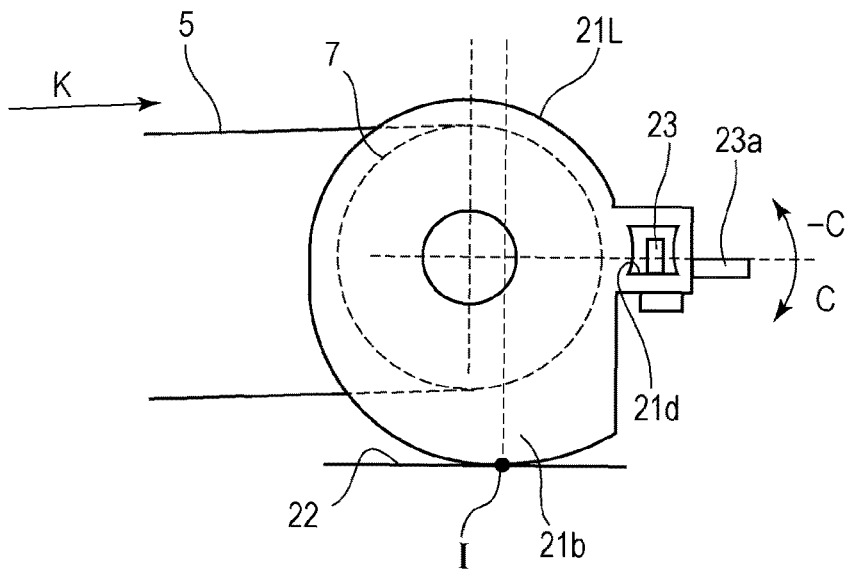
FIG. 14 is a side view illustrating a part of a belt-lateral-shift-adjusting mechanism according to a second embodiment.
Figure 15:
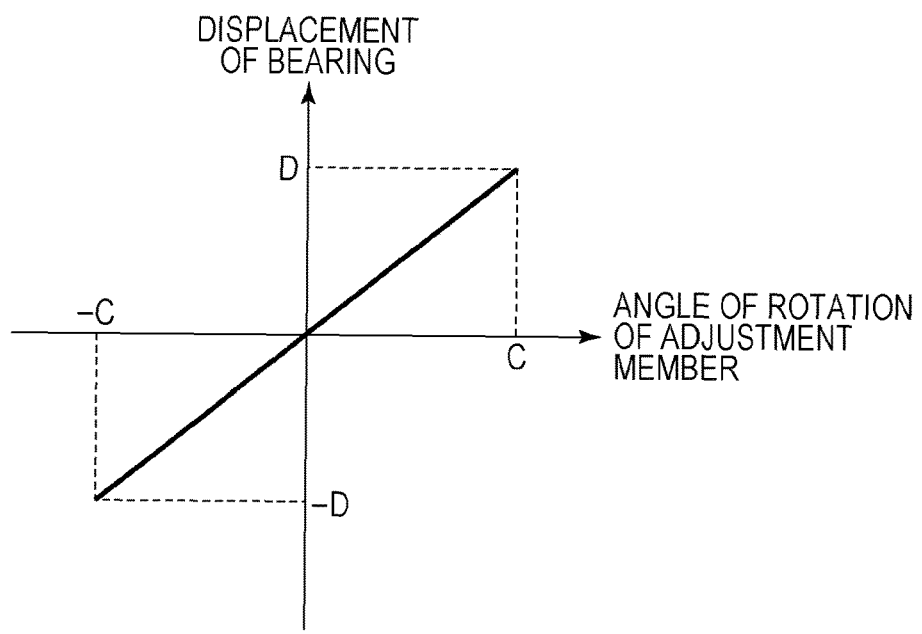
FIG. 15 is a graph illustrating the angle of rotation of an adjustment member and the displacement of a bearing in the second embodiment.
Figure 16:
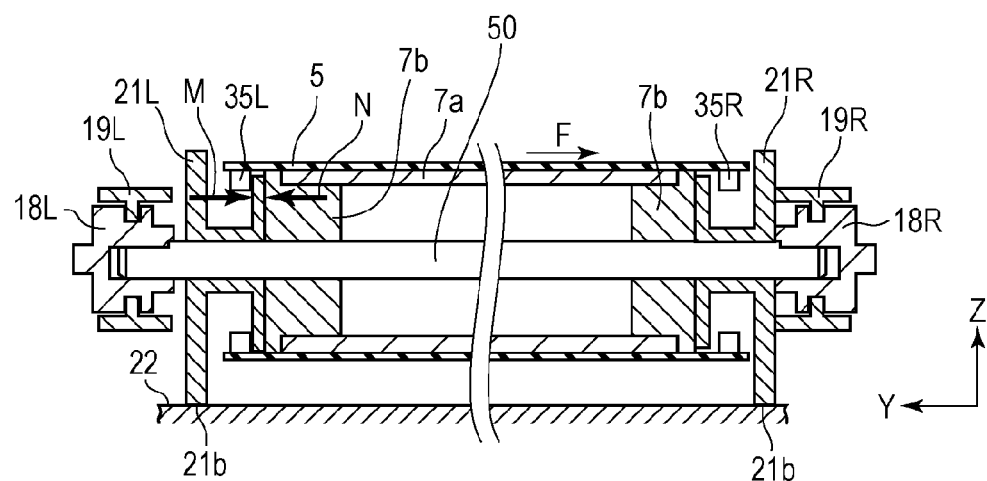
FIG. 16 is a schematic sectional view of the belt-lateral-shift-adjusting mechanism according to the second embodiment.

Referring to FIGS. 14 to 16, a belt-lateral-shift-adjusting mechanism according to the second embodiment will briefly be described. FIG. 14 is a schematic sectional view illustrating the belt-lateral-shift-adjusting mechanism according to the second embodiment. FIG. 14 is a schematic sectional view illustrating an adjustment member 21L according to the second embodiment. An adjustment member 21R has the same configuration as the adjustment member 21L, and description thereof is omitted. As illustrated in FIG. 14, in the adjustment member 21L according to the second embodiment, the shape of the curved cam surface 21b and the position of engagement with the link member 23 are inverse to those in the first embodiment. The link-member-engaging portions 21d of the respective adjustment members 21R and 21L are provided on the downstream side in the direction of belt rotation with respect to the tension roller shaft 50.

When the adjustment member 21L rotates in the direction of belt rotation (the direction of arrow C), the tension roller bearing 18L is lifted. When the adjustment member 21L rotates in the direction (the direction of arrow-C) opposite to the direction of belt rotation, the tension roller bearing 18L is lowered. The relationship between the angle of rotation of the adjustment member 21L and the displacement of the tension roller bearing 18L is graphed in FIG. 15.

FIG. 16 is a schematic sectional view of the belt-lateral-shift-adjusting mechanism according to the second embodiment. The position regulating ribs 35R and 35L provided at the two respective ends of the intermediate transfer belt 5 are allowed to come into contact with the respective adjustment members 21R and 21L. As illustrated in FIG. 14, the intermediate transfer belt 5 is transported in the direction of arrow K. If the intermediate transfer belt 5 is laterally shifted in the direction of arrow F (for example, toward one end side) illustrated in FIG. 16, the position regulating rib 35L (the rib on the other end side) comes into contact with the adjustment member 21L, whereby the adjustment member 21L is driven to rotate. When the adjustment member 21L is rotated in the direction of arrow C (the same as the direction of arrow K) by the lateral-shift force exerted by the intermediate transfer belt 5, the tension roller bearing 18L is lifted because the curved cam surface 21b of the adjustment member 21L is in contact with the frictional surface 22.

When the adjustment member 21L is rotated, the adjustment member 21R on the other side is rotated with the aid of the link member 23 in the direction (the direction of arrow-C) opposite to the rotation of the adjustment member 21L, as in the first embodiment. Hence, the tension roller bearing 18R is lowered (in the direction of arrow-Z). As a result of the above series of movements, the tension roller 7 is tilted, whereby the lateral shift of the intermediate transfer belt 5 is adjusted.

Now, focusing on the movement of the tension roller 7 in the longitudinal direction (Y direction), the tension roller 7 receives the reaction force with respect to the lateral-shift force exerted by the intermediate transfer belt 5, and thus produces a force acting in the direction of arrow N, as described above. Hence, the adjustment member 21L is held between the position regulating rib 35L and the tension roller 7 and is thus driven. That is, the adjustment member 21L obtains a driving force from the position regulating rib 35L and the tension roller 7. Furthermore, the tension roller 7 exerts the force on the side of the adjustment member 21L. Therefore, the tension roller 7 does not prevent the movement of the adjustment member 21R and the belt-lateral-shift-adjusting operation.

As described above, the lateral shift of the intermediate transfer belt 5 is adjustable with the position regulating ribs 35R and 35L. By driving the adjustment members 21R and 21L via the position regulating ribs 35R and 35L, the load applied to the intermediate transfer belt 5 is further reduced without bringing one of the belt ends 5a into contact with the adjustment member 21R or 21L.

Figure 17:
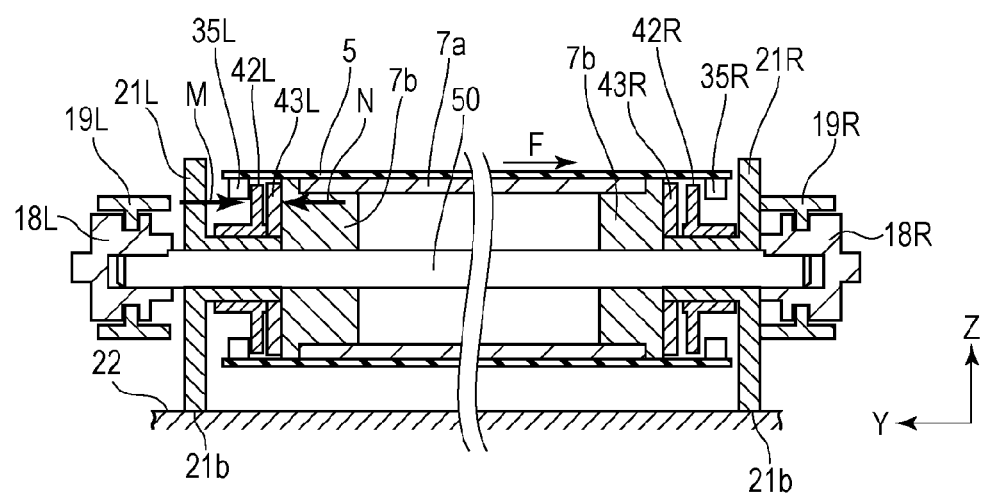
FIG. 17 is a sectional view of a belt-lateral-shift-adjusting mechanism according to a modification of the second embodiment.

FIG. 17 illustrates another transmission mechanism that transmits a driving force to either of the adjustment members 21R and 21L. In the second embodiment, the transmission mechanism includes rib pulleys 42R and 42L and clutch plates 43R and 43L. The rib pulleys 42R and 42L rotatably engage with the respective adjustment members 21R and 21L and are coaxial with the tension roller 7. The clutch plates 43R and 43L are connected to the respective adjustment members 21R and 21L and are configured to move at the same speed as the adjustment members 21R and 21L.

As illustrated in FIG. 17, if the intermediate transfer belt 5 is laterally shifted in the direction of arrow F, the position regulating rib 35L moves in the direction of arrow F. The rib pulley 42L and the clutch plate 43L are thus held between the position regulating rib 35L and the tension roller 7, whereby the adjustment member 21L is rotated. Since the adjustment member 21L rotates at the same speed as the clutch plate 43L, the tension roller 7 is tilted, whereby the lateral shift of the intermediate transfer belt 5 is adjusted.

The rib pulley 42L is in contact with the clutch plate 43L at a portion thereof having the smaller radius with respect to the center of rotation thereof, and is in contact with the position regulating rib 35L at a portion thereof having the larger radius. Hence, when the rib pulley 42L comes into contact with the position regulating rib 35L, the rib pulley 42L rotates at substantially the same speed as the position regulating rib 35L. Therefore, wear of the position regulating rib 35L is suppressed.

Third Embodiment

The first embodiment concerns a mechanism of adjusting the lateral shift of the intermediate transfer belt 5 by tilting the tension roller 7 with the adjustment members 21R and 21L, the tension roller 7 being configured to apply a tension to the intermediate transfer belt 5 with the aid of the tension springs 20. A third embodiment concerns a configuration of regulating the lateral shift of the intermediate transfer belt 5 by tilting the follower roller 8, which rotates by following the rotation of the intermediate transfer belt 5, with respect to the driving roller 6 with the aid of the adjustment members 21R and 21L. The other elements according to the third embodiment has the same configuration as those included in the image forming apparatus 10 according to the first embodiment, and such elements are denoted by corresponding ones of the reference numerals used in the first embodiment.

Figure 18:
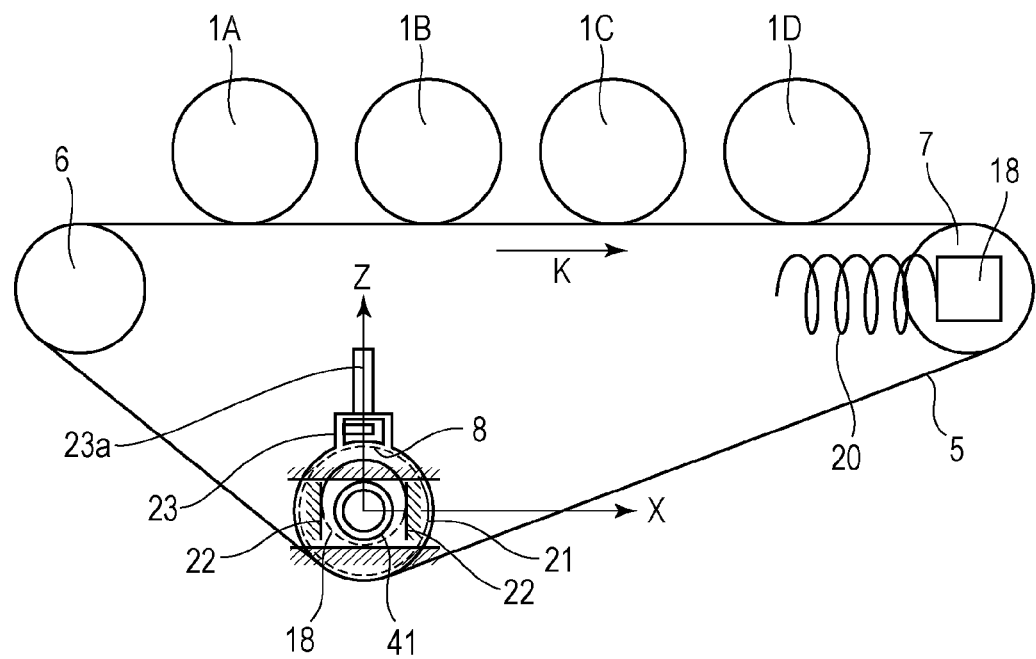
FIG. 18 is a sectional view of an intermediate transfer belt unit according to a third embodiment.

As illustrated in FIG. 18, the adjustment members 21R and 21L may be provided at two respective ends of the follower roller 8. First, an operation performed by the belt-lateral-shift-adjusting mechanism will be described. As in the first embodiment, if the intermediate transfer belt 5 is laterally shifted to one end side and comes into contact with the adjustment member 21L, the adjustment member 21L rotates by receiving a rotational force from the intermediate transfer belt 5.

With the rotation of the adjustment member 21L, the curved cam surface 21b rotates, and the state of contact between the curved cam surface 21b and the frictional surfaces 22 changes, whereby a corresponding one of the ends of the follower roller 8 is displaced in the −X direction. When the adjustment member 21L rotates, the adjustment member 21R connected thereto with the link member 23 rotates in the opposite direction, whereby the other end of the follower roller 8 supported by the adjustment member 21R is displaced in the +X direction. Thus, by displacing the follower roller 8 in the X direction such that the lateral shift of the intermediate transfer belt 5 is undone, the lateral shift of the intermediate transfer belt 5 is adjusted.

Figure 19:
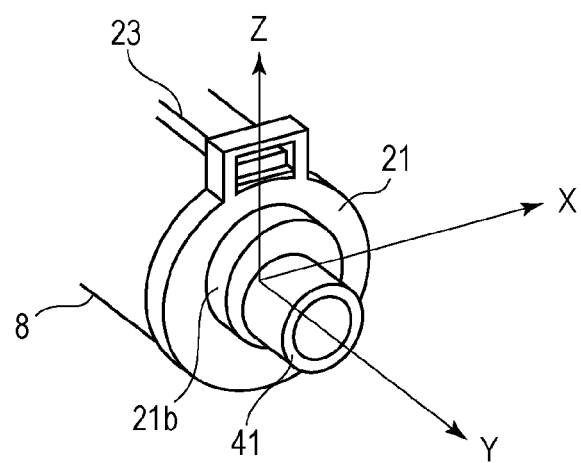
FIG. 19 illustrates the shape of an adjustment member according to the third embodiment.
Figure 20A:
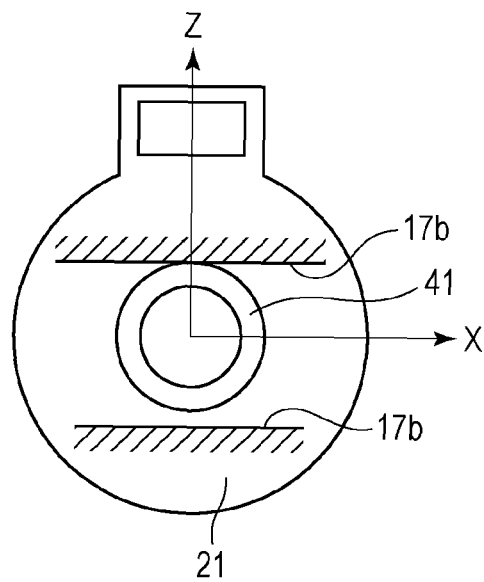
FIGS. 20A and 20B illustrate the relationship among the adjustment member, bearing guide portions, and frictional surfaces according to the third embodiment.
Figure 20B:
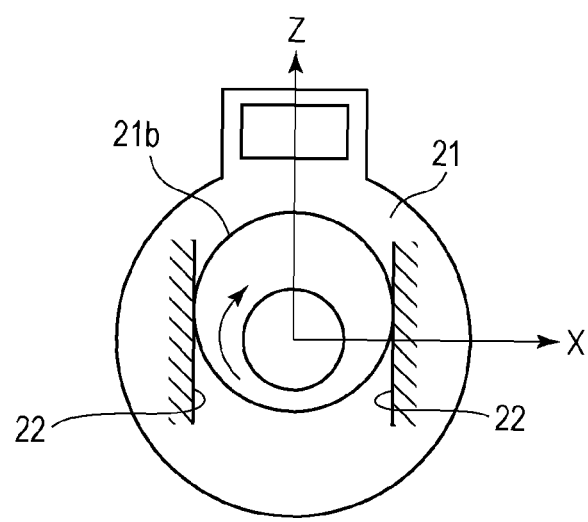

Now, details of the belt-lateral-shift-adjusting mechanism will be described. Elements provided on the R side and the L side are the same and are herein not distinguished from each other by reference characters R and L. FIG. 19 schematically illustrates the shape of one of the adjustment members 21 according to the third embodiment. FIGS. 20A and 20B schematically illustrate the relationship among the adjustment member 21, bearing guide portions 17b, and frictional surfaces 22 according to the third embodiment.

In the third embodiment, the two ends of the follower roller 8 are each supported by the adjustment member 21 and a follower-roller bearing 41. The curved cam surface 21b is fitted between the frictional surfaces 22, whereby the adjustment member 21 regulates the X-direction position of the end of the follower roller 8. That is, the adjustment member 21 solely determines the X-direction position of the end of the follower roller 8.

However, the adjustment member 21 does not regulate the Z-direction position of the end of the follower roller 8. The ends of the follower roller 8 are supported by the respective adjustment members 21. The adjustment members 21 are connected to each other with the link member 23, as in the first embodiment.

The follower-roller bearing 41 is brought into contact with one of the bearing guide portions 17b by the tensile force exerted by the intermediate transfer belt 5, whereby the Z-direction position of the end of the follower roller 8 is regulated. The two respective ends of the follower roller 8 are supported by the respective follower-roller bearings 41. The follower-roller bearings 41 are movable in the X direction independently of each other. That is, the two ends of the follower roller 8 are positioned by the respective adjustment members 21 and the respective follower-roller bearings 41. The follower-roller bearings 41 are each a rotatable cylindrical bearing, so that the sliding resistance between the follower-roller bearing 41 and the bearing guide portion 17b is small. Hence, the follower-roller bearing 41 is movable smoothly in the X direction.

In the third embodiment, the adjustment member 21 and the follower-roller bearing 41 are provided as separate components, and the tensile force exerted by the intermediate transfer belt 5 is borne by the follower-roller bearing 41. That is, the tensile force exerted by the intermediate transfer belt 5 is prevented from acting on the contact points between the curved cam surface 21b and the frictional surfaces 22. Hence, the tensile force exerted by the intermediate transfer belt 5 does not act as a rotational load applied to the adjustment member 21, and the rotational load applied to the adjustment member 21 is suppressed to be small.

In the third embodiment, the curved cam surface 21b is made of polyacetal that provides high slidability, whereby the sliding resistances between the curved cam surface 21b and the frictional surfaces 22 are reduced. Hence, even if the rotational force from the intermediate transfer belt 5 is small, the adjustment member 21 can rotate. In the third embodiment, the curved cam surface 21b has a small radius. Hence, the braking moment that brakes the rotation of the adjustment member 21 is reduced. That is, the rotational load applied to the adjustment member 21 is reduced. Therefore, even if the rotational force from the intermediate transfer belt 5 is small, the adjustment member 21 can rotate.

As described above, in the belt-lateral-shift-adjusting mechanism according to the present invention in which one of a plurality of stretching members is tilted with respect to another stretching member, the one stretching member is not limited to the tension roller 7 and may be the follower roller 8.

Fourth Embodiment

The first embodiment concerns a mechanism of transmitting a force by bringing one of the belt ends 5a of the intermediate transfer belt 5 into direct contact with the adjustment member 21R or 21L. In the mechanism in which the belt end 5a comes into direct contact with the adjustment member 21R or 21L, if the difference in rotational speed between the intermediate transfer belt 5 and the adjustment member 21 is large, a frictional force due to the speed difference may occur at the belt end 5a.

In contrast, a fourth embodiment concerns a mechanism of adjusting the lateral shift of the intermediate transfer belt 5 by moving the adjustment members 21R and 21L avoiding the contact between the belt ends 5a and the adjustment members 21R and 21L. The other elements are the same as those included in the image forming apparatus 10 according to the first embodiment and are denoted by corresponding ones of the reference numerals used in the first embodiment.

Figure 21A:
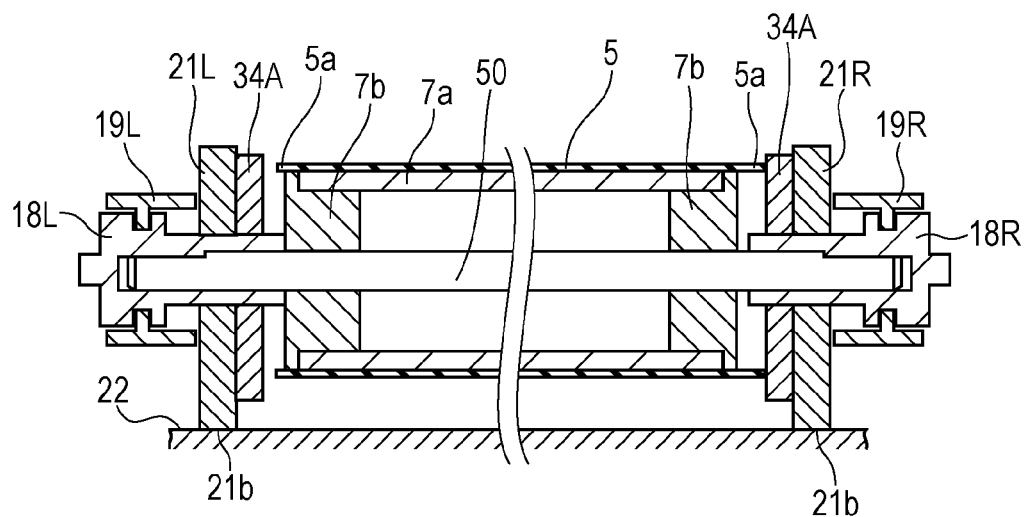
FIGS. 21A and 21B are schematic sectional views of a belt-lateral-shift-adjusting mechanism according to a fourth embodiment.

As illustrated in FIG. 21A, the fourth embodiment concerns a configuration in which a rotational force from one of the belt ends 5a is transmitted to a corresponding one of the adjustment members 21R and 21L via a rotational-force-transmitting member 34A that transmits the rotational force. The rotational-force-transmitting member 34A is made of, for example, polyacetal that is harder than the material forming the intermediate transfer belt 5 and rotates at substantially the same speed as the intermediate transfer belt 5 by coming into contact with the belt end 5a. Since the rotational-force-transmitting member 34A rotates at substantially the same speed as the intermediate transfer belt 5, there is substantially no speed difference between the belt end 5a and the rotational-force-transmitting member 34A. Hence, the frictional force produced at the belt end 5a and acting in the direction of belt rotation is reduced.

Figure 21B:
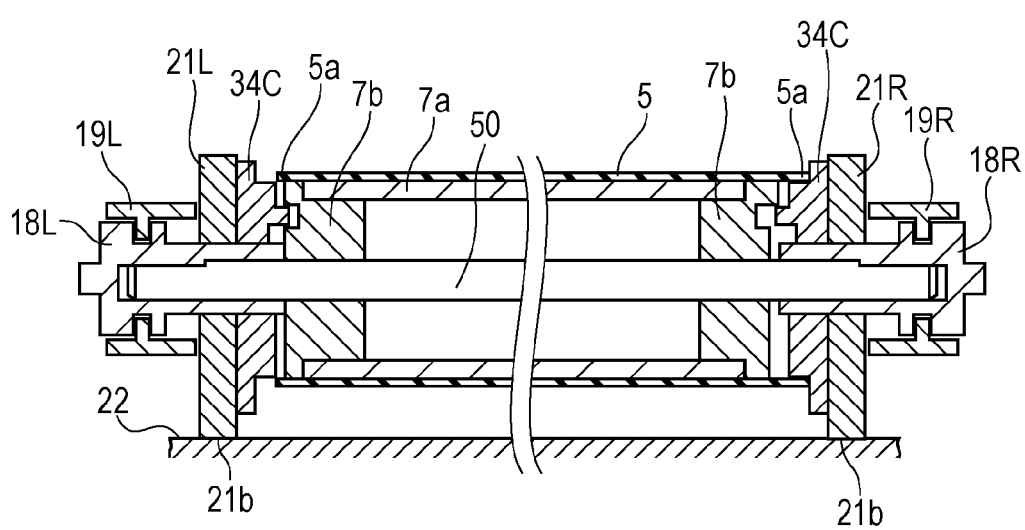

As illustrated in FIG. 21B, the rotational-force-transmitting member 34A may be substituted by a rotational-force-transmitting member 34C that engages with the tension roller flange 7b and rotates together with the tension roller flange 7b.

In either case, since the rotational-force-transmitting member 34A or 34C is pressed against one of the adjustment members 21R and 21L by the belt end 5a only while the lateral-shift force from the intermediate transfer belt 5 is applied thereto, the adjustment members 21R or 21L is rotatable by the frictional force occurring at the contact surface between the rotational-force-transmitting member 34A or 34C and the adjustment members 21R or 21L.

Thus, even if the rotational speed of the adjustment members 21R and 21L and the rotational speed of the intermediate transfer belt 5 differ from each other when the lateral shift of the intermediate transfer belt 5 is to be adjusted, the frictional force at the belt end 5a due to the speed difference is reduced by the rotational-force-transmitting member 34A or 34C.

Fifth Embodiment

A fifth embodiment concerns a mechanism in which the sensor unit 24 is supported by the intermediate transfer belt unit 16. The other elements excluding the mechanism of supporting the sensor unit 24 are the same as those included in the image forming apparatus 10 according to the first embodiment and are denoted by corresponding ones of the reference numerals used in the first embodiment.

(Mechanism of Supporting Sensor Unit)

The mechanism of supporting the sensor unit 24 will now be described. As illustrated in FIG. 1, the sensor unit 24 is provided across the intermediate transfer belt 5 from the tension roller 7.

Figure 26:
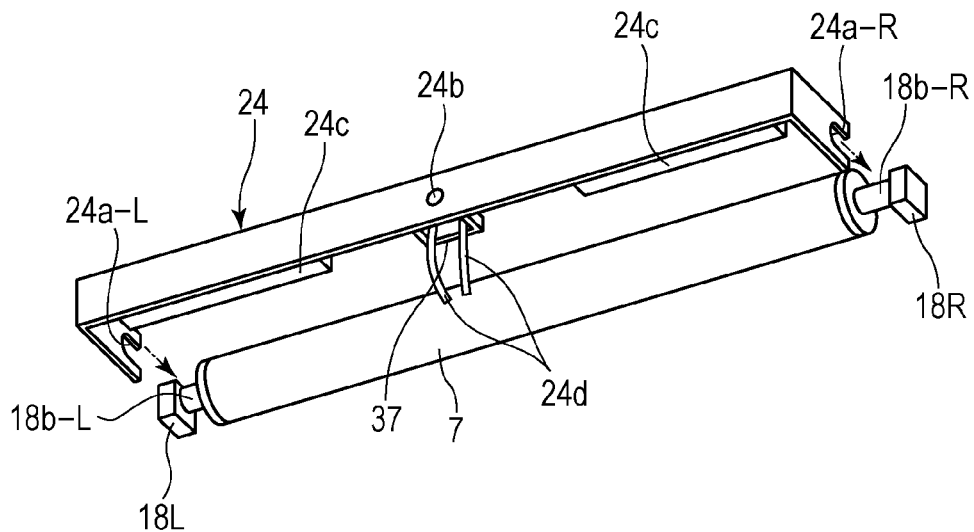
FIG. 26 is an exploded perspective view illustrating how a detecting device and the stretching member engage with each other.
Figure 27:
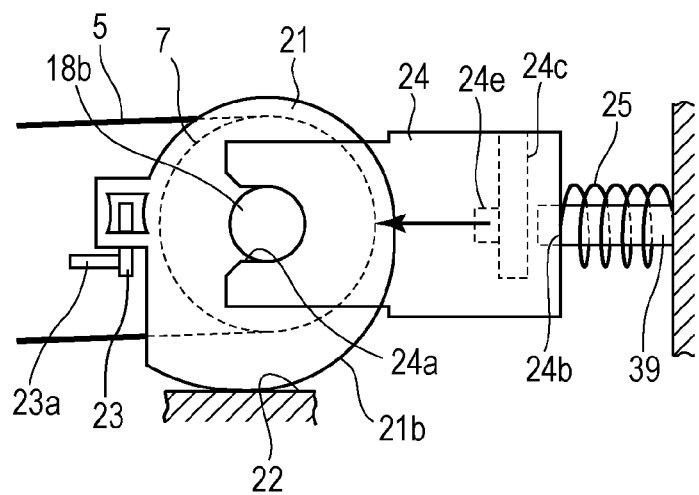
FIG. 27 is a side view illustrating the state of engagement between the detecting device and the stretching member.

FIG. 26 is an exploded perspective view illustrating how the sensor unit 24 and the tension roller 7 engage with each other. FIG. 27 is a side view illustrating the state of engagement between the sensor unit 24 and the tension roller 7.

The sensor unit 24 includes a supporting portion and detecting portions. The supporting portion has grooves 24a-R and 24a-L, which correspond to a first engaging portion and a second engaging portion, respectively, intended for positioning of the ends of the sensor unit 24 in the belt width direction. The sensor unit 24 also has a sensor-unit point-of-support hole 24b provided in a central portion of the sensor unit 24 in the belt width direction and about which the sensor unit 24 is swingable. The detecting portions each include a density detecting sensor 24e configured to emit light toward the intermediate transfer belt 5 and to receive the reflection of the light, a sensor substrate 24c, and a sensor cable 24d connected to an electric substrate (not illustrated).

The density detecting sensor 24e is fixed to the sensor unit 24 such that the light emitted therefrom passes through the center of the arc formed by a corresponding one of the grooves 24a-R and 24a-L. The grooves 24a-R and 24a-L at the two respective ends of the sensor unit 24 are made to engage with cylindrical portions 18b-R and 18b-L of the tension roller bearings 18R and 18L, respectively, whereby the sensor unit 24 is positioned. A sensor-unit-urging spring 25 (second urging member) urges the sensor unit 24 so that the grooves 24a-R and 24a-L and the cylindrical portions 18b-R and 18b-L are not disengaged from each other. Since the cylindrical portions 18b-R and 18b-L of the tension roller bearings 18R and 18L are concentric with the tension roller 7, the direction of emission from each density detecting sensor 24e is assuredly oriented toward the center of the tension roller flange 7b. Furthermore, the distance between the density detecting sensor 24e and the surface of the intermediate transfer belt 5 stretched around the tension roller flange 7b is maintained to be constant.

A sensor-unit-supporting pin 39 provided on the body of the image forming apparatus 10 is fitted in the sensor-unit point-of-support hole 24b, whereby the sensor unit 24 is swingable about the sensor-unit-supporting pin 39 as a swing pin. The sensor-unit-supporting pin 39 is provided at substantially the same position in the belt width direction as the link-member support pin 23a. Therefore, the center of swing of the sensor unit 24 and the center of swing of the tension roller 7 substantially coincide with each other in the belt width direction. Hence, if the angle of tilt of the tension roller 7 changes, the sensor unit 24 swings about the sensor-unit-supporting pin 39 while the grooves 24a-R and 24a-L at the two ends of the sensor unit 24 are in engagement with the respective tension roller bearings 18R and 18L, whereby the sensor unit 24 follows the tilt of the tension roller 7. By allowing the sensor unit 24 to follow the changes in the angle of tilt of the tension roller 7, the movement of changing the tilt of the tension roller 7 is not prevented by the sensor unit 24.

The sensor-unit point-of-support hole 24b and the engaging portion of the sensor-unit-supporting pin 39 are provided substantially at the center of gravity of the sensor unit 24, whereby the weight of the sensor unit 24 is not borne by the tension roller bearing 18. Thus, the sensor unit 24 suppresses the increase in the load occurring during the belt-lateral-shift-adjusting operation.

As with the link member 23, the sensor unit 24 is held in such a manner as to be displaceable in the axial direction thereof with respect to the sensor-unit-supporting pin 39, and the sensor unit 24 is urged toward the tension roller 7 by the sensor-unit-urging spring 25. That is, the direction of urging by the sensor-unit-urging spring 25 is opposite to the direction of urging by the tension spring 20. Furthermore, the urging force exerted by the sensor-unit-urging spring 25 is sufficiently smaller than the urging force applied to the intermediate transfer belt 5 by the tension spring 20. Therefore, the sensor unit 24 can follow the movement of the tension roller 7 caused by the contraction (changes in the circumferential length) of the intermediate transfer belt 5. Hence, there is no chance that the sensor-unit-urging spring 25 may prevent the change in the position of the tension roller 7 caused by the contraction (changes in the circumferential length) of the intermediate transfer belt 5.

As illustrated in FIGS. 26 and 27, the sensor substrates 24c carrying the density detecting sensors 24e and the sensor cables 24d provided to the body of the image forming apparatus 10 are held by a cable bundling guide 37 provided on the sensor unit 24 near the sensor-unit point-of-support hole 24b and are connected to the outside of the sensor unit 24. If the sensor cables 24d are connected to the outside of the sensor unit 24 from positions near the grooves 24a-R and 24a-L at the ends of the sensor unit 24, the swinging of the sensor unit 24 may be hindered by forces applied thereto from the sensor cables 24d. Hence, after the sensor cables 24d are held near the center of swing of the sensor unit 24, the sensor cables 24d are connected to the outside, whereby the sensor cable 24d is prevented from hindering the swing of the sensor unit 24.

Thus, the lateral shift of the intermediate transfer belt 5 is adjustable while the sensor unit 24 is prevented from hindering the change in the angle of tilt of the tension roller 7.

The fifth embodiment is also applicable to a belt-lateral-shift-adjusting mechanism in which neither of the belt ends 5a do not come into contact with the adjustment members 21R and 21L. For example, on the inner circumferential side of the intermediate transfer belt 5, the adjustment members 21R and 21L may be configured to rotate by receiving the lateral-shift force from the position regulating ribs 35R and 35L provided at the respective ends in the belt width direction.

Since the sensor unit 24 follows the tilt of the tension roller 7 by swinging about the sensor-unit-supporting pin 39, the sensor unit 24 is prevented from hindering the movement of changing the angle of tilt of the tension roller 7.

Other Embodiments

The image forming apparatus 10 according to any of the above embodiments includes the intermediate transfer belt unit 16 as a belt transporting device. The belt transporting device and the image forming apparatus according to the present invention are not limited to those described above. For example, the belt transporting device may be a transport belt unit including a transport belt configured to transport a recording material to which a toner image is directly transferred from a photoconductor drum.

Figure 22:
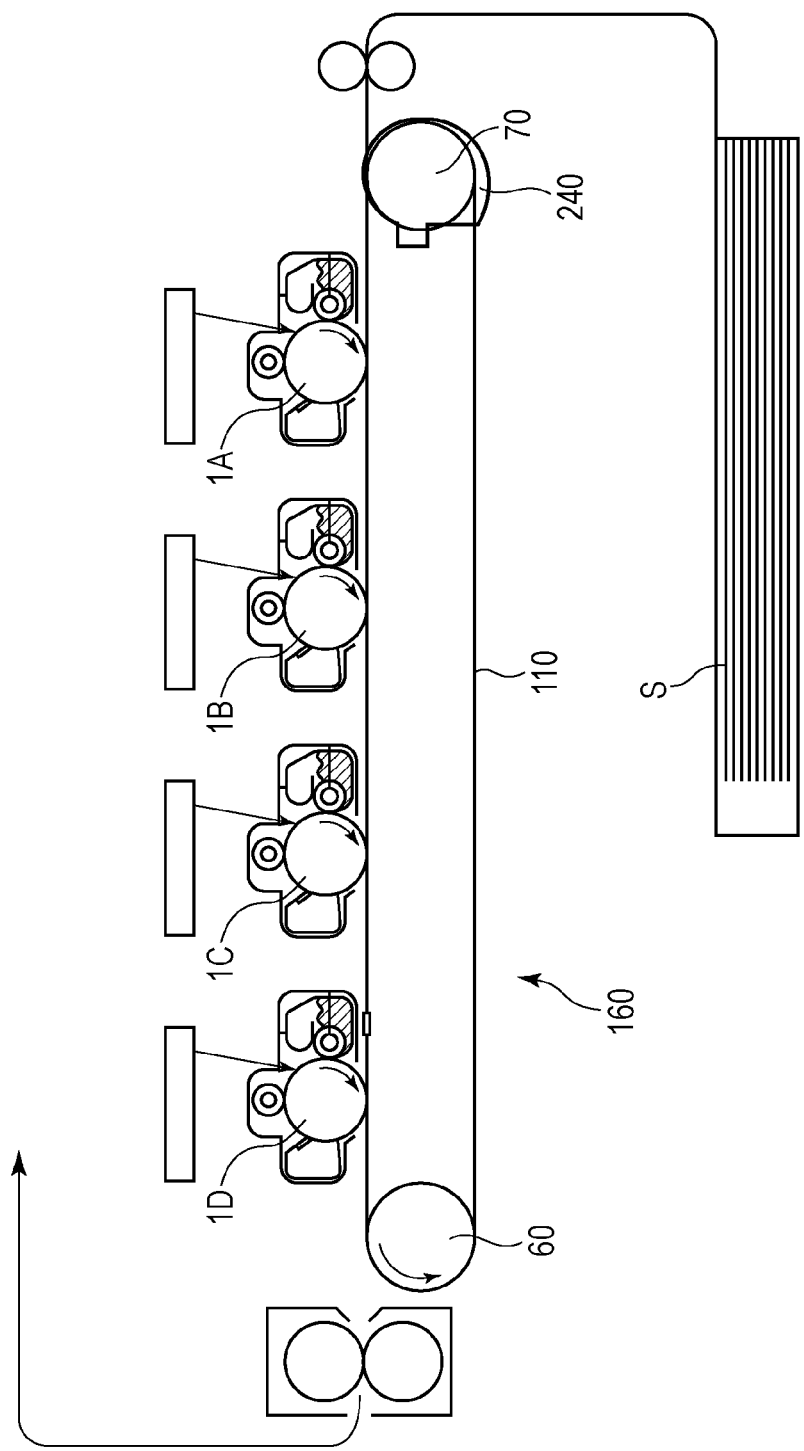
FIG. 22 schematically illustrates an image forming apparatus according to another embodiment.

FIG. 22 schematically illustrates an image forming apparatus according to another embodiment of the present invention. Image forming units of the image forming apparatus are the same as those of the image forming apparatus 10 according to the first embodiment, and description thereof is omitted. An intermediate transfer belt unit 160 includes a transport belt 110 configured to transport a transfer material S, a driving roller 60 configured to drive and rotate the transport belt 110 stretched therearound, a tension roller 70 urged by an urging member so as to apply a tension to the transport belt 110 stretched therearound, and an adjustment member 240.

As illustrated in FIG. 22, in this embodiment, the transfer material S is fed from a feed tray to the transport belt 110 that is under rotation in accordance with the timing of image formation.

While the transfer material S carried by the transport belt 110 is transported at an appropriate timing through transfer nips defined between the transport belt 110 and respective photoconductor drums 1A to 1D, respective toner images are directly transferred to the transport belt 110 from the photoconductor drums 1A to 1D at the transfer nips.

If the transport belt 110 configured as described above is laterally shifted, adjustment members 240R and 240L provided coaxially with the tension roller 70 rotate with respect to each other, whereby the lateral shift of the transport belt 110 is adjusted.

With such a configuration, even in the belt transporting device including the transport belt 110, the lateral shift of the transport belt 110 is adjustable with a reduced load applied to the transport belt 110.

The first to fourth embodiments each employ, as an interlocking device, the connecting member that directly connects the adjustment members 21R and 21L. Alternatively, the interlocking device may be any device other than the connecting member, provided that, when the adjustment member 21L (21R) is moved by receiving the lateral-shift force from the laterally shifted intermediate transfer belt 5, the adjustment member 21R (21L) on the other side moves by the same length but in the opposite direction. For example, in a case where the adjustment members 21R and 21L are connected to respective gears, if the belt is laterally shifted and the adjustment member 21L (21R) is rotated by the lateral-shift force, a corresponding one of the gears is also rotated. Furthermore, after the rotational force of the gear is converted into a force acting in the opposite direction, the rotational force is transmitted to the gear connected to the other adjustment member 21R (21L). This rotational force of the gear rotates the adjustment member 21R (L) by the same amount but in the opposite direction.

Thus, the lateral shift of the belt is adjustable with a reduced load applied to the belt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A belt transporting device comprising:
   an endless belt configured to rotate;
   a first stretching member configured to stretch the belt;
   a second stretching member configured to stretch the belt; and
   a belt adjusting unit configured to adjust movement of the belt with respect to a widthwise direction of the belt perpendicular to a movement direction of the belt by tilting the first stretching member with respect to the second stretching member,
   wherein the belt-adjusting unit includes:
   a first adjustment member provided at one end side of the first stretching member with respect to the widthwise direction, wherein the first adjustment member is rotatable relative to the first stretching member to change a position of an end portion of the first stretching member,
   a second adjustment member provided at another end side of the first stretching member with respect to the widthwise direction, wherein the second adjustment member is rotatable relative to the first stretching member to change a position of another end portion of the first stretching member,
   a first frictional surface configured to cause friction against the first adjustment member,
   a second frictional surface configured to cause friction against the second adjustment member, and
   an interlocking device configured to rotate the second adjustment member with respect to the second frictional surface according to a rotation of the first adjustment member with respect to the first frictional surface, in a case where the first adjustment member receives a force from the belt when the belt is shifted in the widthwise direction of the belt.

2. The belt transporting device according to claim 1, wherein the first adjustment member includes a first force receiving portion configured to receive a force from the belt, and
   wherein, in a case where the first adjustment member rotates in the belt moving direction when the first force receiving portion receives the force from the belt, the interlocking device rotates the second adjustment member in an opposite direction to a belt moving direction.

3. The belt transporting device according to claim 1, wherein the first adjustment member and the second adjustment member respectively comprise a curved cam surface and rotatable with respect to the first stretching member.

4. The belt transporting device according to claim 1, wherein the interlocking device connects the first adjustment member and the second adjustment member.

5. The belt transporting device according to claim 3, wherein the interlocking device is swingable by centering around a pivot shaft provided at a substantive central area in the widthwise direction.

6. The belt transporting device according to claim 4, wherein the first adjustment member and the second adjustment member respectively comprise an engaging portion configured to engage with the interlocking device, and
   wherein the engaging portion is provided at an inner circumferential side of the belt.

7. The belt transporting device according to claim 1, wherein, in a case where the belt is shifted in widthwise direction, the first force receiving portion receives a force from an edge portion in widthwise direction of the belt.

8. The belt transporting device according to claim 1,
   wherein the belt comprises ribs which are provided on an inner circumferential side of the belt at both sides of the belt in widthwise direction, and
   wherein, in a case where the belt is shifted in widthwise direction, the first force receiving portion receives a force from the ribs provided on the belt.

9. The belt transporting device according to claim 1,
   wherein the first stretching member is a tension roller configured to apply a tension to the belt by being urged by an urging member, and
   wherein the first stretching member includes:
   a first bearing supporting member configured to hold a shaft of the tension roller and the first adjustment member, and
   a second bearing supporting member configured to hold a shaft of the tension roller and the second adjustment member,
   wherein the first bearing supporting member and the second bearing supporting member are respectively configured to be rotatable by centering around a supporting point.

10. The belt transporting device according to claim 9, wherein the supporting point of the bearing supporting member is set below a bisector of a belt winding angle with respect to the tension roller.

11. The belt transporting device according to claim 1,
    wherein the first frictional surface and the second frictional surface are positioned on a same height position, and
    wherein inclination of the first stretching member with respect to the second stretching member is maintained by a contact state between the first frictional surface and the first adjustment member and a contact state between the second frictional surface and the second adjustment member.

12. The belt transporting device according to claim 1, wherein the first stretching member includes a roller and a shaft.

13. An image forming apparatus comprising:
    a plurality of image carrying members each configured to carry a toner image in a different color; and
    a belt transporting device, wherein the belt transporting device includes:
    an endless belt configured to rotate,
    a first stretching member configured to stretch the belt,
    a second stretching member configured to stretch the belt, and
    a belt adjusting unit configured to adjust movement of the belt with respect to a widthwise direction of the belt perpendicular to a movement direction of the belt by tilting the first stretching member with respect to the second stretching member,
    wherein the belt-adjusting unit includes:
    a first adjustment member provided at one end side of the first stretching member with respect to the widthwise direction, wherein the first adjustment member is rotatable relative to the first stretching member to change a position of an end portion of the first stretching member, a second adjustment member provided at another end side of the first stretching member with respect to the widthwise direction, wherein the second adjustment member is rotatable relative to the first stretching member to change a position of another end portion of the first stretching member, a first frictional surface configured to cause friction against the first adjustment member, a second frictional surface configured to cause friction against the second adjustment member, and an interlocking device configured to rotate the second adjustment member with respect to the second frictional surface according to a rotation of the first adjustment member with respect to the first frictional surface, in a case where the first adjustment member receives a force from the belt when the belt is shifted in the widthwise direction of the belt, wherein the belt transporting device is configured to transfer the toner image.

\* \* \* \* \*